(12) United States Patent
Helms et al.

(10) Patent No.: US 9,595,363 B2
(45) Date of Patent: *Mar. 14, 2017

(54) SURFACE CHEMICAL MODIFICATION OF NANOCRYSTALS

(71) Applicant: The Regents of The University of California, Oakland, CA (US)

(72) Inventors: Brett Anthony Helms, San Francisco, CA (US); Delia Jane Milliron, Oakland, CA (US); Evelyn Louise Rosen, Berkeley, CA (US); Raffaella Buonsanti, Oakland, CA (US); Anna Llordes, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 362 days.

This patent is subject to a terminal disclaimer.

(21) Appl. No.: 14/078,340

(22) Filed: Nov. 12, 2013

(65) Prior Publication Data
US 2014/0158950 A1 Jun. 12, 2014

Related U.S. Application Data

(60) Provisional application No. 61/734,284, filed on Dec. 6, 2012.

(51) Int. Cl.
| | |
|---|---|
| *B05D 5/06* | (2006.01) |
| *H01B 1/22* | (2006.01) |
| *B82Y 40/00* | (2011.01) |
| *B82Y 30/00* | (2011.01) |

(52) U.S. Cl.
CPC ............... *H01B 1/22* (2013.01); *B82Y 40/00* (2013.01); *B82Y 30/00* (2013.01)

(58) Field of Classification Search
CPC ......... B05D 5/06; B82Y 40/00; G02F 1/0018; G02F 1/15; G02F 1/153; G02F 1/155; G02F 1/1525; G02F 1/1523; H01B 1/22
USPC ........ 252/521.1, 512, 519.4, 519.33, 519.34, 252/518.1; 359/265, 270, 275; 423/509, 423/561.1, 633, 622, 594.9, 263, 610; 427/58, 108, 164, 165; 420/507, 416, 466
See application file for complete search history.

(56) References Cited

U.S. PATENT DOCUMENTS

| | | | | |
|---|---|---|---|---|
| 9,207,513 | B2 * | 12/2015 | Milliron | G02F 1/1508 |
| 2011/0068321 | A1 * | 3/2011 | Pickett | C09K 11/025 257/13 |
| 2011/0068322 | A1 * | 3/2011 | Pickett | C09K 11/02 257/13 |
| 2014/0346442 | A1 * | 11/2014 | Nag | H01L 29/0665 257/29 |
| 2015/0109652 | A1 * | 4/2015 | Milliron | B82Y 20/00 359/275 |
| 2015/0298988 | A1 * | 10/2015 | Helms | C01B 19/007 252/519.12 |

FOREIGN PATENT DOCUMENTS

| | | | | |
|---|---|---|---|---|
| ES | WO 2008071829 | A1 * | 6/2008 | B82Y 30/00 |
| WO | WO 2012071507 | A1 * | 5/2012 | C30B 7/14 |
| WO | WO 2013154779 | A1 * | 10/2013 | G02F 1/1508 |

OTHER PUBLICATIONS

Angang Dong et al., "A Generalized Ligand-Exchange Strategy Enabling Sequential Surface Functionalization of Colloidal Nanocrystals", J. Am. Chem. Soc. 2011, 133, 998-1006, published Dec. 22, 2010.*
Marissa A. Caldwell et al., "Driving oxygen coordinated ligand exchange at nanocrystal surfaces using trialkylsilylated chalcogenides", Chem. Commun., 2011, 47, 556-558 (published Nov. 23, 2010).*
Buonsanti, R. et al. (2012). "Assembly of Ligand-Stripped Nanocrystals into Precisely Controlled Mesoporous Architectures," Nano Letters, 12:3872-3877.
Duong, J.T. et al. (2012). "Efficient Polymer Passivation of Ligand-Stripped Nanocrystal Surfaces," Journal of Polymer Science, 50:3719-3727.
Rosen, E.L. et al. (2012). "Exceptionally Mild Reactive Stripping of Native Ligands from Nanocrystal Surfaces by Using Meerwein's Salt," Angewandte Communications, 51:684-689.
Rosen, E.L. et al. (2012). "Supplemental—Exceptionally Mild Reactive Stripping of Native Ligands from Nanocrystal Surfaces by Using Meerwein's Salt," Angewandte Communications, 16 pages.
Rosen, E.L. et al. (2013). "Influence of Surface Composition on Electronic Transport through Naked Nanocystal Networks," Chemistry of Materials, 16 pages.
Williams, T.E. et al. (2014). "NIR-Selective Electrochromic Heteromaterial Frameworks: A Platform to Understand Mesoscale Transport Phenomena in Solid-State Electrochemical Devices," The Royal Society of Chemistry, 8 pages.
Rivest, Jessy, et al. "Evolution of Ordered Metal Chalcogenide Architectures Through Chemical Transformations." Journal of the American Chemical Society. May 10, 2013, 135, 7446-7449.
Rivest, Jessy, et al. "Evolution of Ordered Metal Chalcogenide Architectures Through Chemical Transformations." Supporting Information. May 10, 2013.

* cited by examiner

*Primary Examiner* — Douglas McGinty
(74) *Attorney, Agent, or Firm* — Lowenstein Sandler LLP

(57) ABSTRACT

Nanocrystals comprising organic ligands at surfaces of the plurality of nanocrystals are provided. The organic ligands are removed from the surfaces of the nanocrystals using a solution comprising a trialkyloxonium salt in a polar aprotic solvent. The removal of the organic ligands causes the nanocrystals to become naked nanocrystals with cationic surfaces.

30 Claims, 18 Drawing Sheets

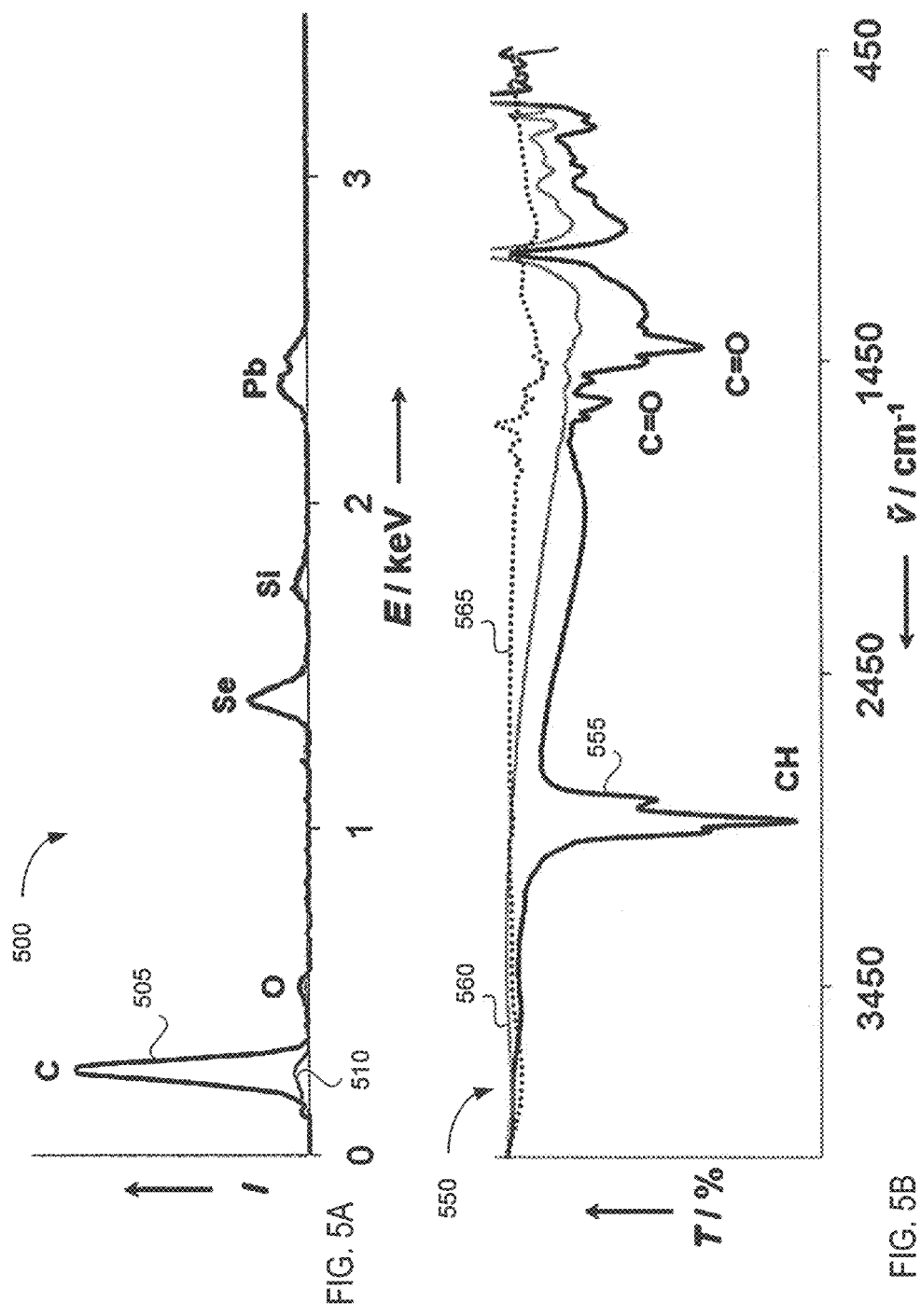

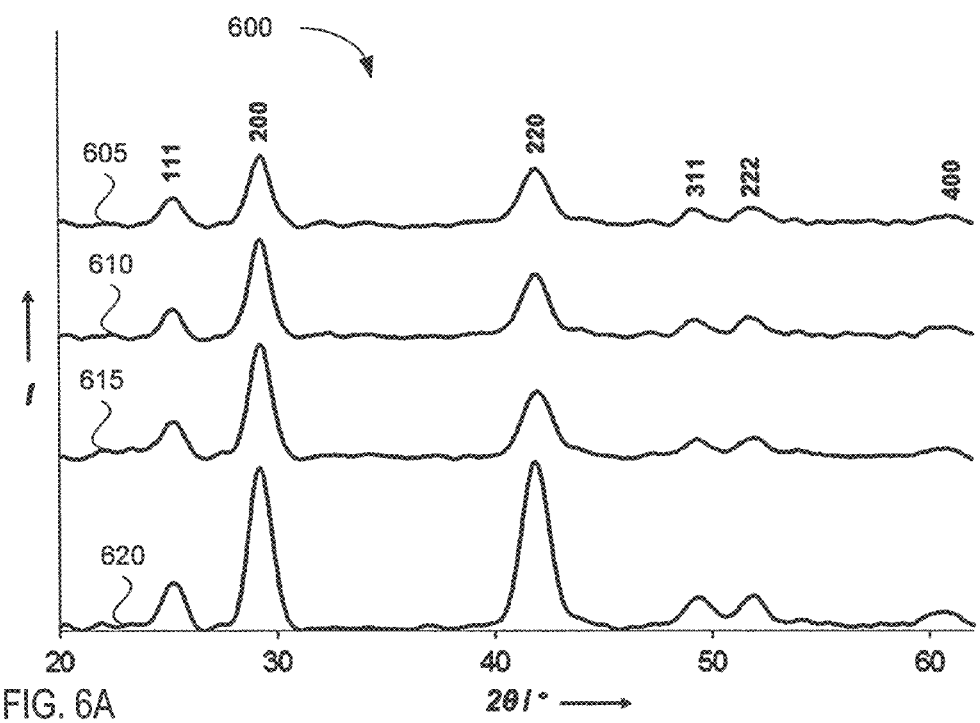
FIG. 6A
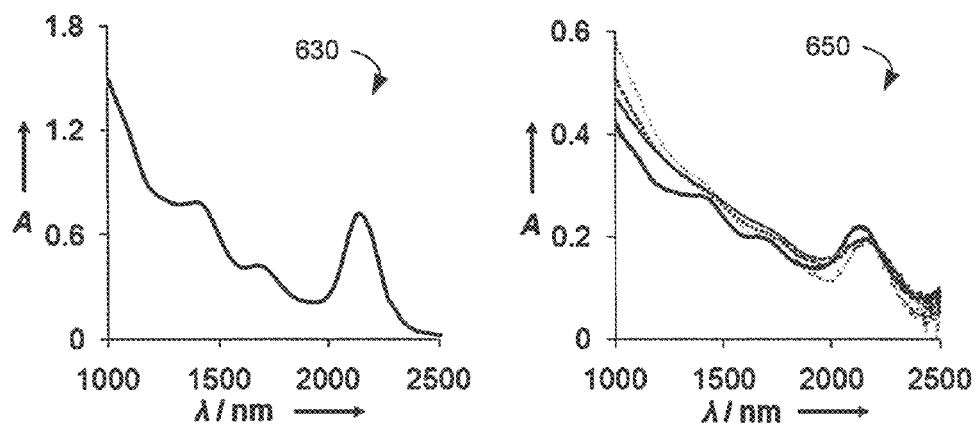
FIG. 6B
FIG. 6C

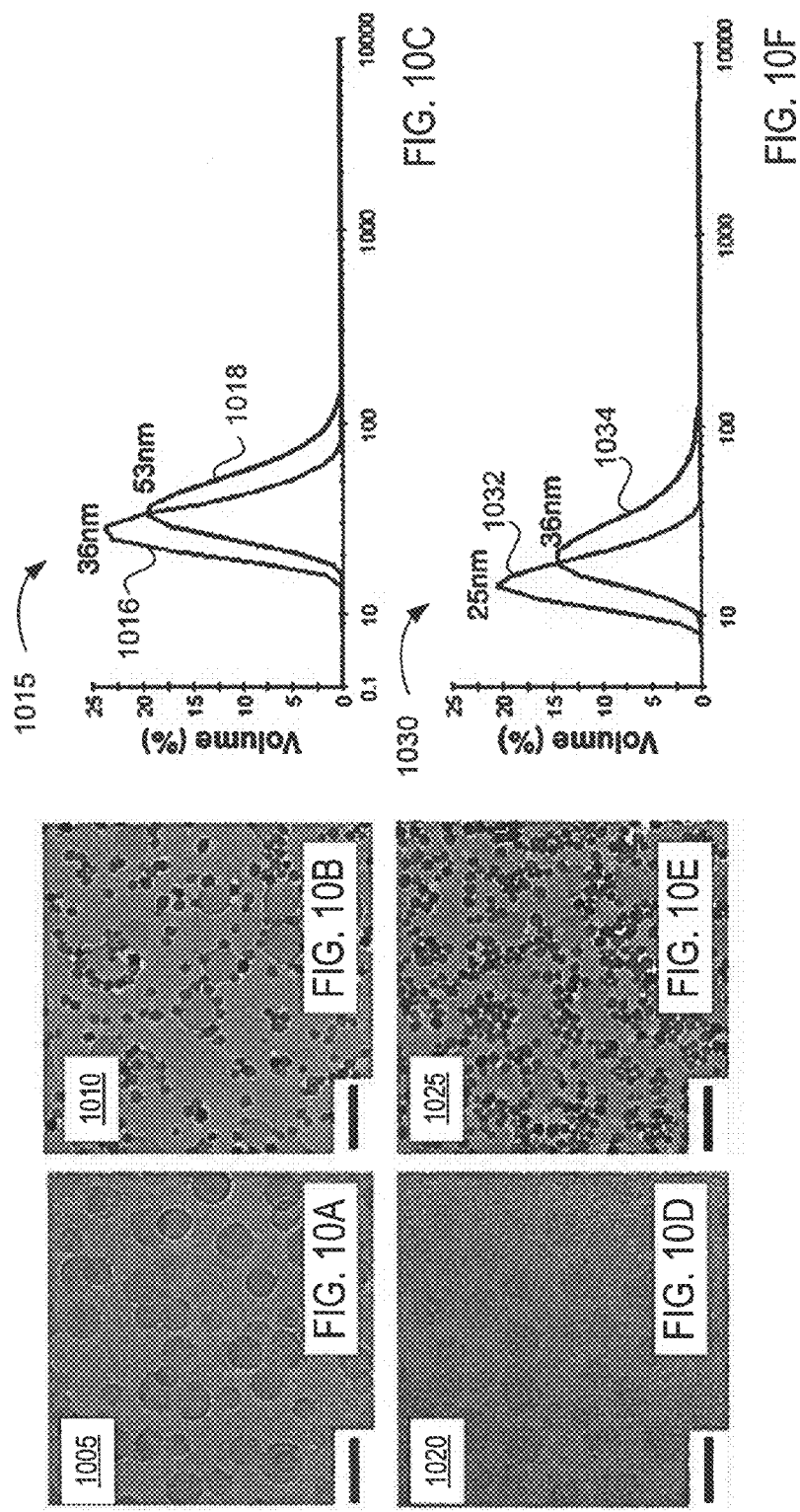

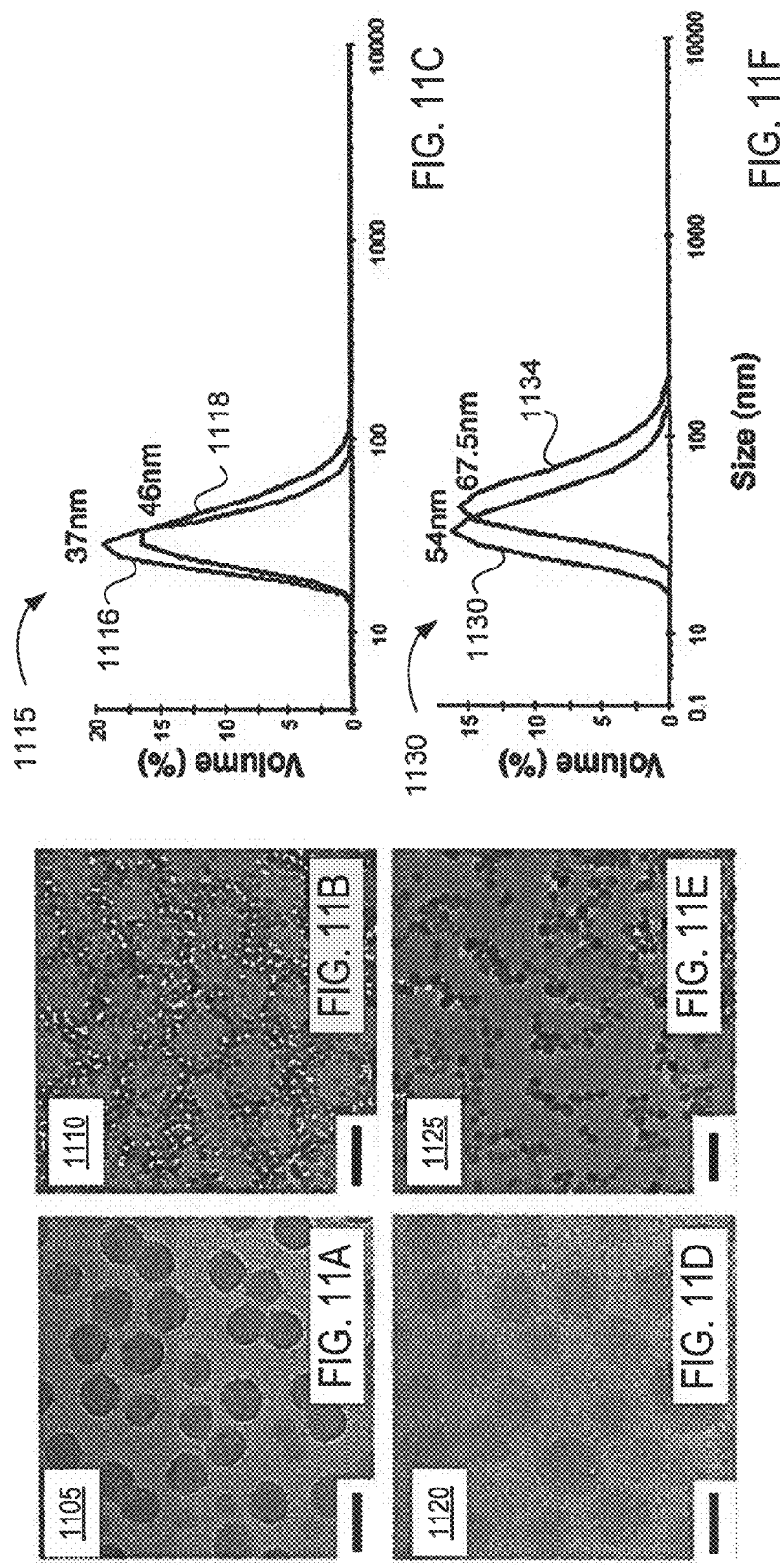

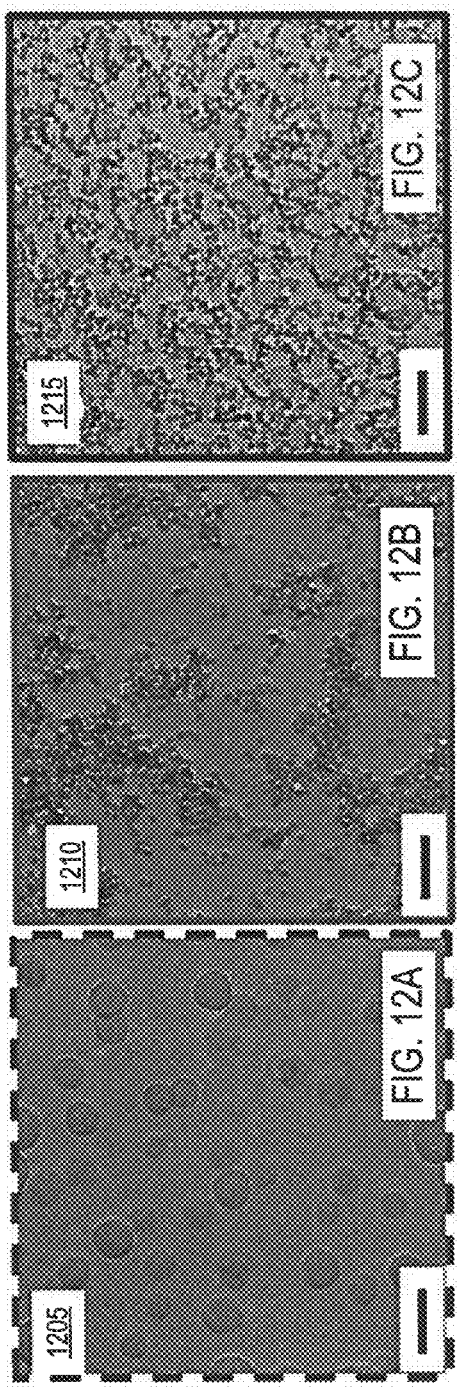
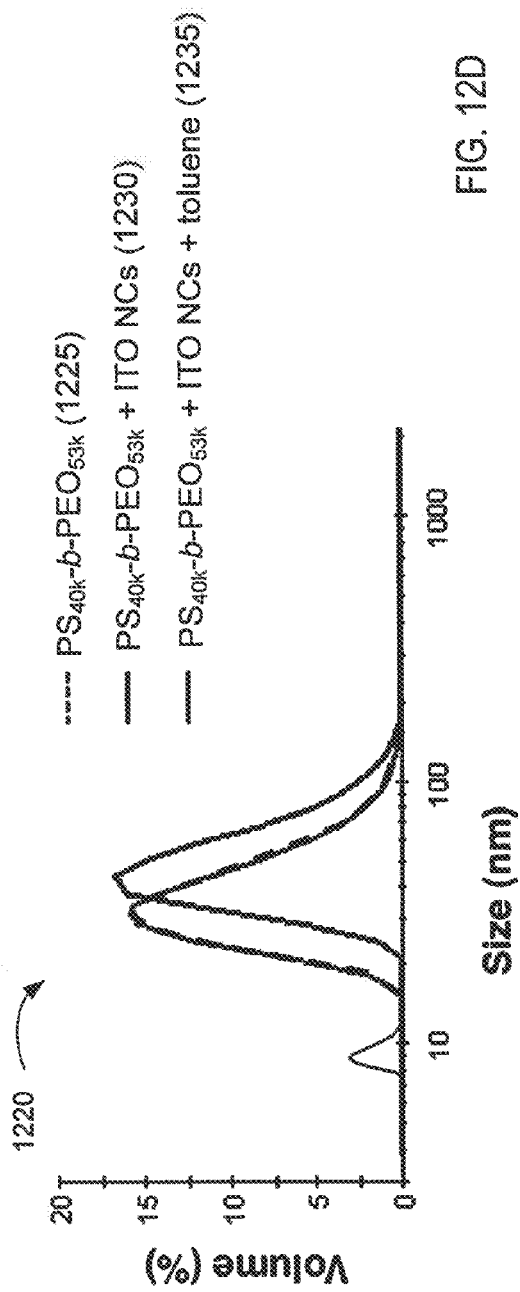
FIG. 12A  FIG. 12B  FIG. 12C
FIG. 12D

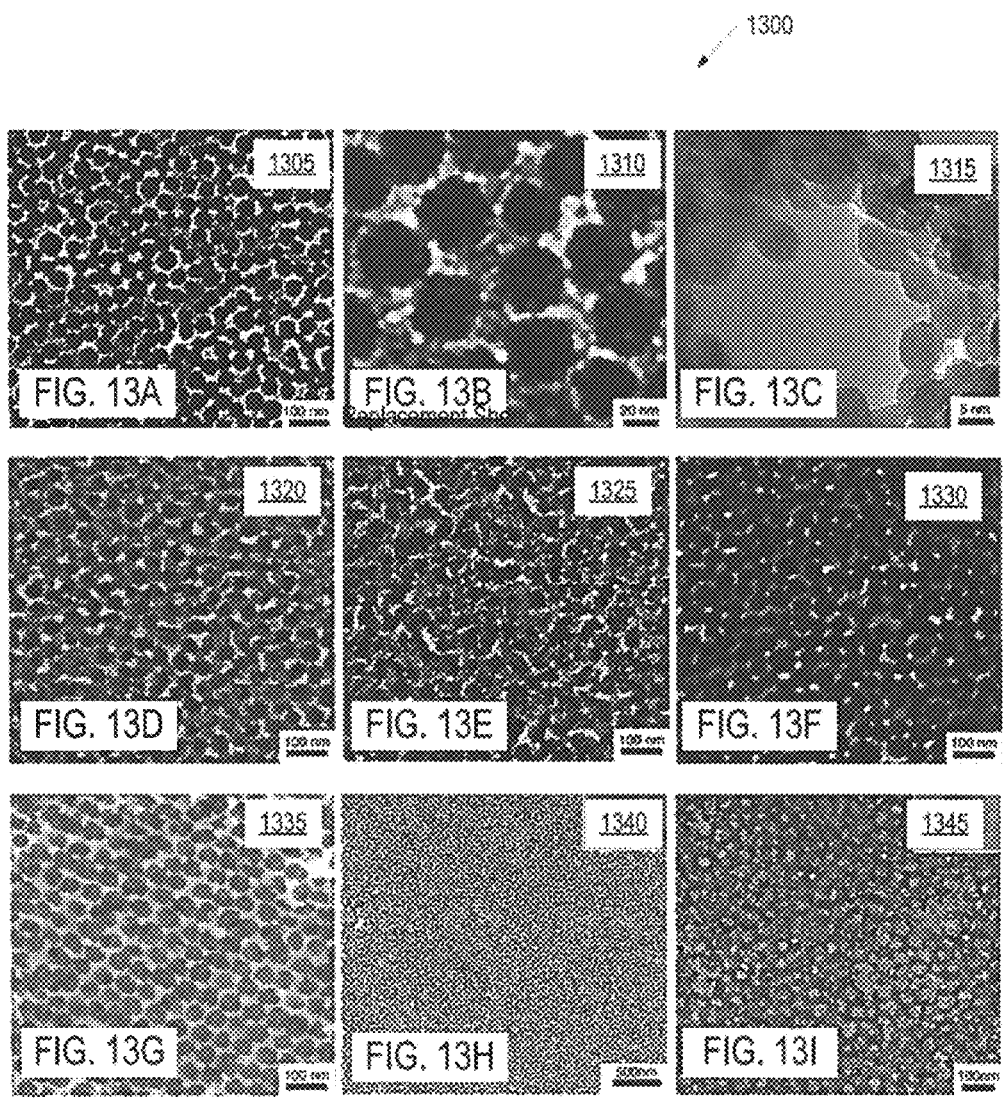

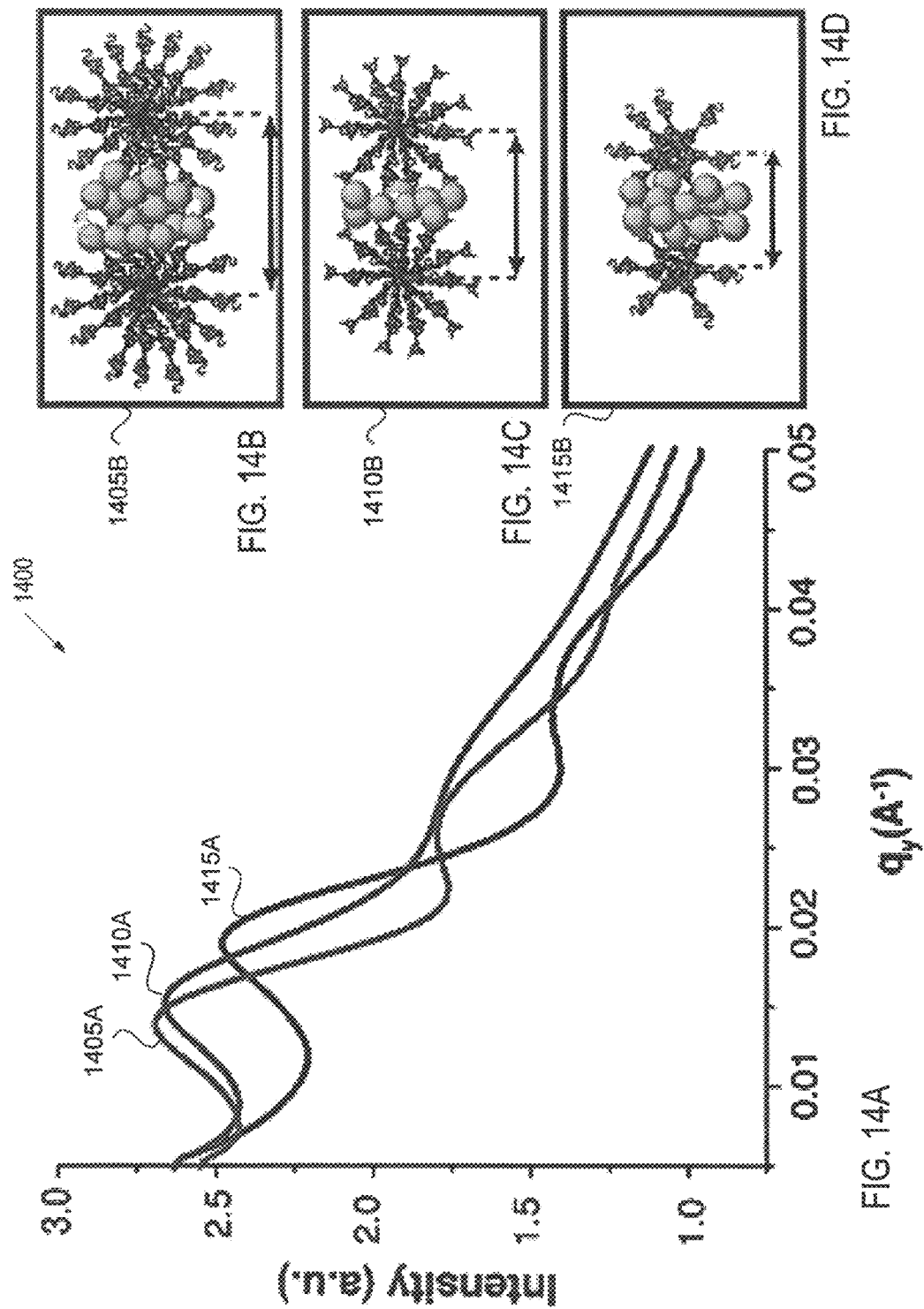

SURFACE CHEMICAL MODIFICATION OF NANOCRYSTALS

RELATED APPLICATIONS

This application claims priority to U.S. Provisional Patent Application No. 61/734,284, filed Dec. 6, 2012, which is herein incorporated by reference.

STATEMENT OF GOVERNMENTAL SUPPORT

This invention was made with government support under Contract No. DE-AC02-05CH11231 awarded by the U.S. Department of Energy. The government has certain rights in the invention.

TECHNICAL FIELD

The present invention relates to the field of nanoparticles, and more particularly to the production and application of ligand-stripped nanoparticles.

BACKGROUND

Native coordinating ligands acquired during the chemical synthesis of colloidal nanocrystals are optimized primarily for their ability to exert control over nanocrystal size, composition, morphology and dispersability, and not necessarily for their final application. In general, native coordinating ligands are hydrophobic and highly insulating, and constitute a significant barrier for charge or ion transport in devices configured from nanocrystals having these ligands. Bare nanocrystal surfaces, while desirable for many applications, can be difficult to obtain reliably and without undesirable consequences. For example, removal of native ligands from nanocrystal dispersions usually results in aggregation or etching, while in thin films their displacement chemically (e.g., by hydrazine or formic acid) often gives inefficient removal of surface ligands. Additionally, thermal treatments to remove ligands from nanocrystals typically leave behind an undesirable residue, require lengthy annealing times, or result in particle sintering.

BRIEF DESCRIPTION OF THE DRAWINGS

FIG. 5A illustrates measurements of a thin film before and after ligands have been stripped from the surfaces of nanocrystals in thin film, in accordance with one embodiment.

FIG. 5B further identifies molecules left at a stripped PbSe surface, as detected by a Fourier transform infrared spectroscopy (FT-IR) analysis.

FIGS. 6A-C illustrate additional measurements of a thin film before and after ligands have been stripped from the surfaces of nanocrystals in the thin film, in accordance with one embodiment.

FIGS. 10A-F illustrate measurements of dispersions containing ITO and PDMA-b-PS, in accordance with one embodiment.

FIGS. 11A-F illustrate measurements of additional dispersions containing ITO and PDMA-b-PS, in accordance with one embodiment.

FIGS. 12A-D illustrate measurements of additional dispersions containing ITO and PS-b-PEO, in accordance with one embodiment.

FIGS. 13A-I illustrate various mesoporous architectures having compositional diversity, in accordance with one embodiment.

FIGS. 14A-D illustrate various mesoporous films having compositional diversity, in accordance with one embodiment.

DETAILED DESCRIPTION

Figure 1:
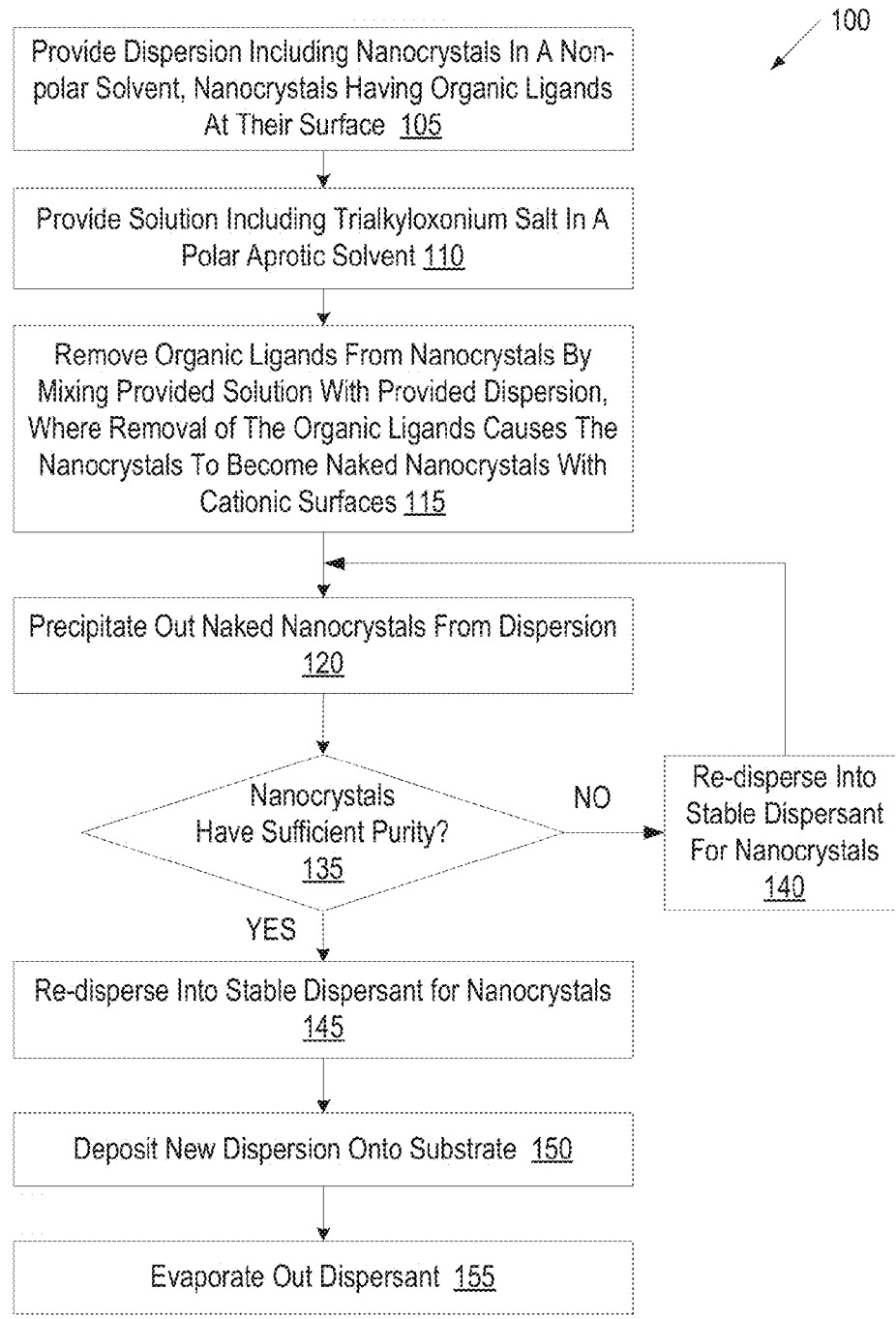
FIG. 1 is a flow chart illustrating a method of stripping organic ligands from surfaces of nanocrystals in a dispersion, in accordance with one embodiment.

Described herein are embodiments for processes of stripping organic ligands from nanocrystals (NCs). Also described are embodiments for processes of forming mesoporous articles such as films and freestanding objects. Also described are embodiments for processes of forming composite materials (e.g., nanocomposites) that include nanocrystals embedded in a polymer matrix. Also described are embodiments for applying a polymer coating to naked nanocrystals.

In one embodiment, a dispersion of nanocrystals in a non-polar solvent is provided, where the nanocrystals have organic ligands at their surfaces. A solution including a trialkyloxonium salt in a polar aprotic solvent is mixed with the dispersion. The solution strips the organic ligands from surfaces of the nanocrystals. The removal of the organic ligands causes the nanocrystals to become naked nanocrystals with cationic surfaces. In another embodiment, the dispersion is deposited onto a substrate to form a film, and the non-polar solvent is evaporated off of the film. A solution including a trialkyloxonium salt in a polar aprotic solvent is used to treat the film (e.g., by successive washings of the film using the solution). The treatment causes the organic ligands to be stripped from the nanocrystals in the film.

Trialkyloxonium is a mild reagent that is able to sever the bond between the nanocrystals and their coordinating ligands without adversely affecting the structural integrity of the nanocrystals. Accordingly, the use of the solution including the trialkyloxonium salt to remove the ligands from the surfaces of the nanocrystals leaves the compositional integrity of these nanocrystals intact. Resultant naked nanocrystals are rendered cationic. The electrostatic charge that is persistent on the naked nanocrystal surface makes them readily dispersible in polar solvents. Naked nanocrystals are useful in a broad spectrum of advanced energy applications, from light-emitting diodes and batteries to field-effect transistors and photovoltaics. Dispersions of naked nanocrystals may also be useful as nanoinks and for facilitating their transfer into polar media for biomedical applications and catalysis.

In one embodiment, a dispersion including nanocrystals in a polar aprotic solvent is provided, where the nanocrystals are naked nanocrystals having cationic surfaces. A solution including a polymer having a nanocrystal tethering domain and porogenic domain is added to the dispersion. In one embodiment, the polymer is a block copolymer. In a further embodiment, the polymer is a block copolymer supramolecule (e.g., a micelle). An article having an ordered composite is formed from the dispersion. The ordered composite includes (i) a polymer matrix formed from the porogenic domain of the polymer and (ii) the nanocrystals embedded in the polymer matrix at the nanocrystal tethering domain. The article may be a film formed by depositing the dispersion onto a substrate, or may be a freestanding object formed by crashing the article out of the dispersion. The article may be thermally or chemically treated to remove the polymer and transform the ordered composite into a mesoporous architecture including the nanocrystals arranged in regular lattices that are ordered in all dimensions. Articles with mesoporous architectures including nanocrystals arranged in regular lattices may be used for applications such as aerospace, electrochromics, thermoelectrics, photovoltaics, energy storage materials, and so on.

Referring now to the figures, FIG. 1 is a flow chart illustrating a method 100 of stripping organic ligands from surfaces of nanocrystals in a dispersion, in accordance with one embodiment. Method 100 may be performed using solution processing techniques at room temperature. The nanocrystals may be synthesized by performing coprecipitation of metal precursors followed by thermal treatment, by laser induced fragmentation, by solvo-thermal synthesis, by microwave-assisted synthesis, by emulsion techniques, and so on. Nanocrystals may also be synthesized using standard Schlenk line processes or by other techniques.

At block 105 of method 100 a dispersion including nanocrystals in a non-polar solvent is provided. Any type of nanocrystal may be used. Examples of nanocrystals include CdSe, CdTe, PbSe, PbS, PbTe, ZnO, $TiO_2$, $\alpha$-$Fe_2O_3$, tin-doped indium oxide (ITO), aluminum-doped zinc oxide (AZO), CdSe/ZnS core-shell quantum dots, CdSe/CdS quantum dot-quantum rods, upconverting $NaYF_4$:Yb/Tm, Ag, and FePt. In one embodiment, the nanocrystals are metal chalcogenide semiconductor nanocrystals. The nanocrystals may be sensitive to Lewis acid degredation in some embodiments. Additionally, nanocrystals coated with many different types of ligands may be used. For example, oleate-coated nanocrystals, carboxylate-coated nanocrystals, phosphonate-coated nanocrystals, amine-coated nanocrystals, sulfide-coated nanocrystals, and so on may be used. One example nanocrystal is an oleate-coated lead selenide nanocrystal (PbSe-OA) having an average size of 7.2+/−0.6 nm and a first absorption feature at 2137 nm. PbSe is an important electronic material due to its large Bohr radius, narrow band gap and efficient multiple exciton generation.

The nanocrystals may initially be suspended in a non-polar solvent such as hexane, heptane, toluene, benzene, chloroform or octane. The non-polar solvent may functionalize and stabilize the nanocrystals. The provided nanocrystals have organic ligands at their surfaces.

Figure 3A:
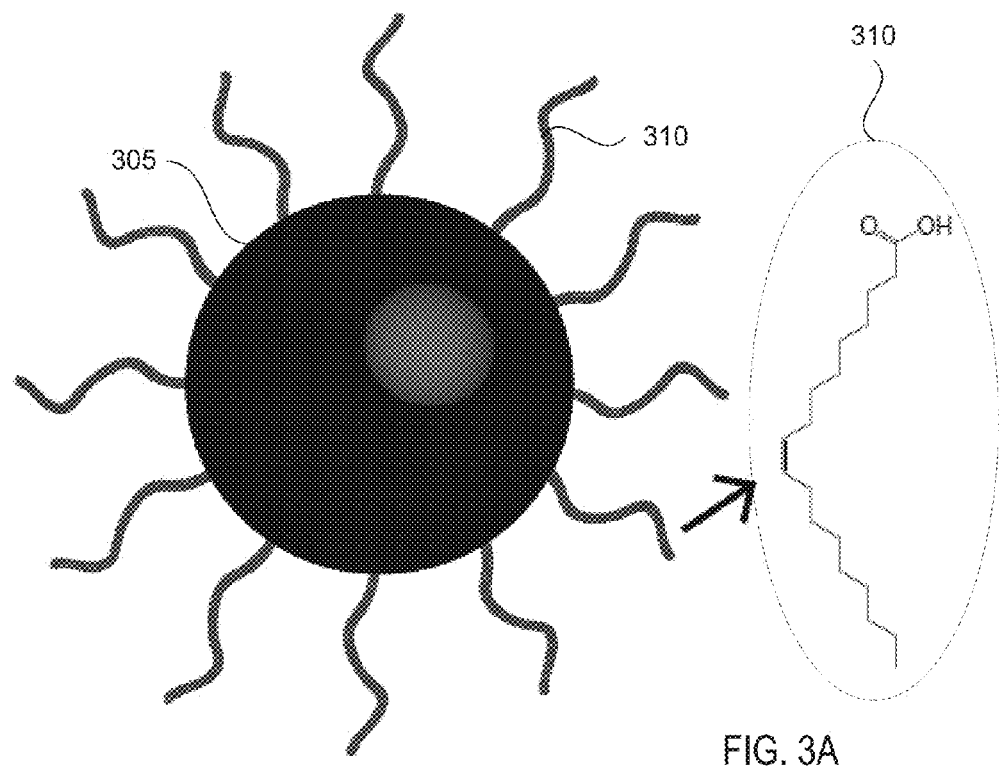
FIG. 3A illustrates a formed nanocrystal having organic ligands at its surface, in accordance with one implementation of the present invention.

FIG. 3A illustrates one embodiment of nanocrystals 305 covered by long organic ligands 310. These organic ligands 310 (e.g., such as oleic acid ligands) can be used to functionalize and stabilize nanocrystal surfaces, and allow for dispersion in non-polar solvents. However, these ligands create an insulating barrier around each nanocrystal, and block the access of molecular species to a surface of the nanocrystals.

Referring back to FIG. 1, at block 110 of method 100 a solution including a trialkyloxonium salt in a polar aprotic solvent is provided. The trialkyloxonium salt may include trimethyloxonium, triethyloxonium, tripropyloxonium, or a combination thereof. The polar aprotic solvent may include N,N-dimethylformamide (DMF), hexamethylphosphoramide (HMPA), acetonitrile, dichloromethane, or a combination thereof. The solution may additionally include a material that acts as counter ions when organic ligands are stripped from surfaces of the nanocrystals. These counter ions may be small molecules that act to weakly coordinate the naked nanocrystals through electrostatic interaction. The material may include tetrafluoroborate, hexafluoroborate, hexachloroantimonate, tetrachloroaurate, tetrabromoaurate, tetrachloroferrate, and/or tetrabromoferrate. In one embodiment, the solution includes a concentration of trialkyloxonium salt of about 1 millimolar (mM) to about 100 mM.

At block 115, the provided solution is mixed with the provided dispersion. This may create a biphasic solution. The trialkyloxonium salt reacts with the nanocrystals to remove (strip) the ligands from surfaces of the nanostructures. Resulting nanocrystals are naked nanocrystals (also referred to as bare or ligand-stripped nanocrystals) with cationic surfaces. This process renders the nanocrystal surfaces bare and hydrophilic, allowing them to interact with each other and with various polymers and solvents. Accordingly, this process enables the nanocrystals to be dispersed in a polar solvent. In one embodiment, a dispersion of nanocrystals in hexanes (e.g., 1-20 mg/mL) is added to trimethyloxonium tetrafluoroborate ($Me_3OBF_4$) dissolved in DMF (e.g., 1-100 mM), forming a biphasic solution. A portion of toluene can be added to the biphasic mixture to aid in the precipitation of the ligand-stripped nanocrystals (e.g., 2-5 parts toluene to 1 part DMF/hexane by volume). After isolation of the precipitate, the ligand-stripped nanocrystals can be redispersed in polar aprotic solvents including DMF, HMPA, and so on. The resulting dispersions may be stable for months at concentrations in excess of around 500 milligrams per milliliter (mg/mL). Stripping of nanocrystal dispersions using other trialkyloxonium salts with $BF_4^-$, $PF_6^-$ and/or $SbCl_6^-$ as the counter ion may yield similar results. The ligands may be stripped without substantially etching the nanocrystals and without substantially altering the physical properties of the nanocrystals. Dispersions of stripped nanocrystals may be useful for numerous applications from nanoinks for device fabrication to biomolecular passivation.

Figure 3B:
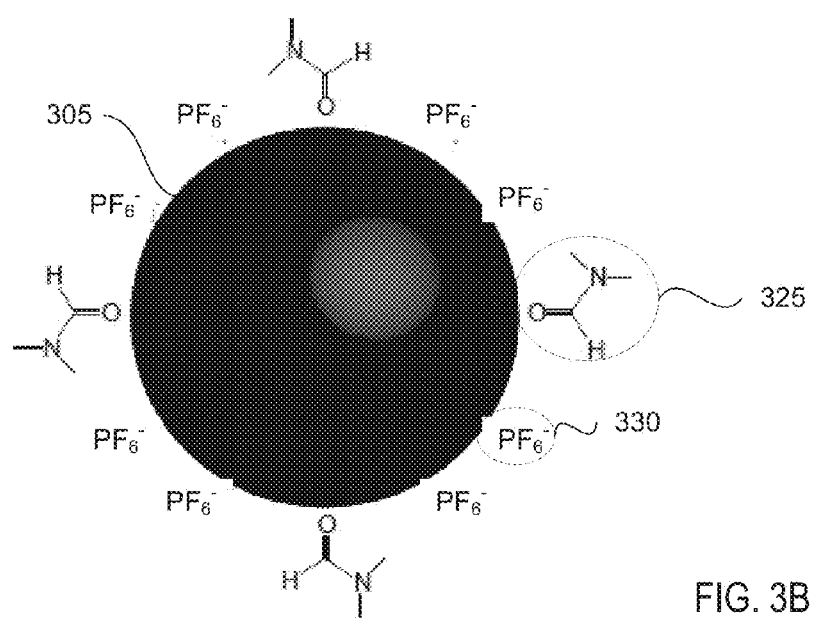
FIG. 3B illustrates a formed nanocrystal after ligands have been stripped from a surface of the nanocrystal, in accordance with one implementation of the present invention.

FIG. 3B illustrates a nanocrystal 305 after the original organic ligands have been stripped from the nanocrystal's 305 surface and replaced by shorter molecules. In the illustrated embodiment, a solution of trialkyloxonium salts and DMF was used to perform the ligand stripping, and the original ligands have been replaced by [PF$_6$]$^-$ anions 330 and DMF molecules 325.

In an example, oleylamine (OLAM) coated ITO nanocystals with initial hydrodynamic size of 18 nm in hexanes may exhibit a hydrodynamic size of 14 nm after treatment with Me$_3$OBF$_4$, consistent with loss of long-carbon chain ligands. Additionally, representative absorbance spectra confirms no etching occurs from the ligand stripping process in some embodiments. Dispersions of stripped nanocrystals may contain adsorbed BF$_4^-$ and DMF, consistent with similar dispersions produced using NOBF$_4$. The quality of the nanocrystals is retained after stripping. In general, no aggregation occurs of stripped nanocrystal dispersions in DMF.

Use of the trialkyloxonium salts to strip native coordinating ligands enables production of ligand-stripped metal chalcogenide nanocrystal dispersions, pointing to the mildness of the procedure. For example, samples of CdSe/ZnS core-shell nanocrystals stripped of phosphonate ligands, purified, and subsequently re-coated with oleates have shown nearly identical photoluminescence, which is exceptionally sensitive to size (i.e. no etching observed), retention of cationic surface adatoms, and the extent of passivation of surface traps. Films of nanocrystals coated by BF$_4^-$ and DMF may exhibit decreased interparticle spacing relative to oleate ligands, which should provide excellent opportunities in nanoink applications where large area nanocrystal-based active layers are required.

Referring back to FIG. 1, at block 120, the nanocrystals may be precipitated out of the first solution. The precipitation may be achieved by separating the nanocrystals from the solution using a centrifuge and washing the nanocrystals with a clean solvent (e.g., chloroform, toluene, or hexane). In one embodiment, an additional liquid is mixed into the dispersion to cause the precipitation, wherein the naked nanocrystals are insolvent in the additional liquid.

The precipitation process may be repeated one or more times to produce a pure dispersion of nanocrystals. After vortexing for a few seconds, the bare nanocrystals may precipitate and then be isolated after the addition of toluene or chloroform followed by pelleting under centrifugation. Precipitates may be washed with additional portions of toluene or chloroform to remove excess trialkyloxonium salt (e.g., Me$_3$OBF$_4$) and ligands (e.g., methyl oleate) before redispersing the solid residue in DMF or other solvent. This procedure substantially avoids contamination of the nanocrystal dispersion by the exogenous stripping agent, which is generally not afforded by other strategies whereby direct transfer to coordinating solvents (e.g., DMF) is implemented.

At block 135 a determination is made as to whether the nanocrystals have sufficient purity. If the nanocrystals have sufficient purity, the method continues to block 145. Otherwise, the nanocrystals are re-dispersed into a liquid in which they are non-solvent, and the method returns to block 135.

At block 145, the nanocrystals are re-dispersed in a liquid that is a stable dispersant for the nanocrystals. The liquid may include DMF, hexamethylphosporamide (HMPA), or a combination thereof. The nanocrystals may form a colloidal suspension or dispersion in the liquid. In one embodiment, the liquid is sonicated and/or heated to cause the naked nanocrystals to become suspended therein.

At block 150, the new dispersion may be deposited onto a substrate to form a film. Any type of solution based deposition process may be used to perform the deposition, such as spin coating, drop casting, spray coating, or doctor blade techniques. The film may have a thickness of up to 0.5 microns in one embodiment. In one embodiment, the film has a thickness of 20-150 nm. Additionally, any type of substrate may be used. At block 155, the dispersant is evaporated out of the film. Multiple layers may be deposited to build up a thickness of the film.

Figure 2:
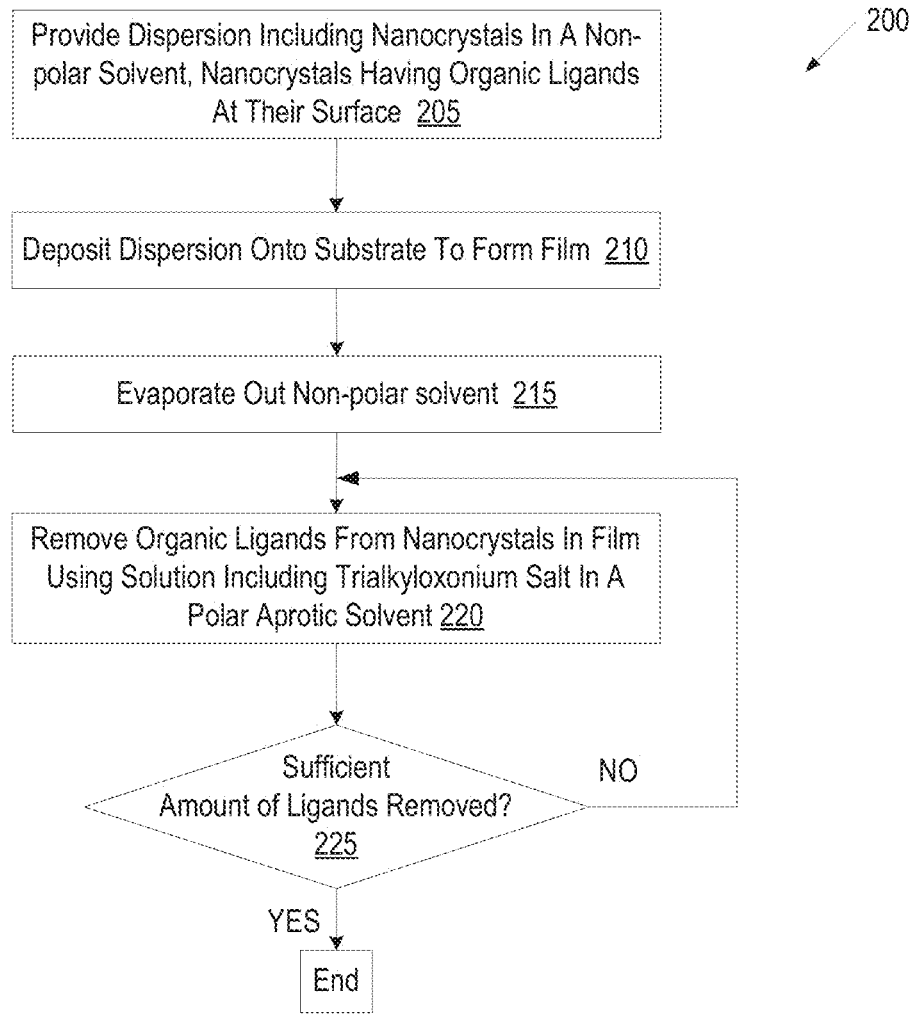
FIG. 2 is a flow chart illustrating a method of stripping organic ligands from surfaces of nanocrystals in a film, in accordance with one embodiment.

FIG. 2 is a flow chart illustrating a method of stripping organic ligands from surfaces of nanocrystals in a film, in accordance with one embodiment. At block 205 of method 200 a dispersion including nanocrystals in a non-polar solvent is provided. Any of the aforementioned nanocrystals may be used. The nanocrystals may be suspended in a non-polar solvent such as hexane, heptane, toluene, benzene or octane. The provided nanocrystals have organic ligands at their surfaces.

At block 210, the dispersion is deposited onto a substrate to form a film. The film may be up to 0.5 microns thick in one embodiment. Thicker films are also possible, but may increase processing times to fully strip ligands from the nanocrystal surfaces. In one embodiment, the film is approximately 90-200 nm thick. The substrate may be silicon, quartz, glass, glass coated with a transparent electrode including doped metal oxides or graphene, a III-V semiconductor material, stainless steel, copper, aluminum, polymer, or any other type of material. Any type of solution based deposition process may be used to perform the deposition, such as spin coating, drop casting, spray coating, or doctor blade techniques. At block 215, the non-polar solvent is evaporated out of the film.

At block 220, a solution including a trialkyloxonium salt in a polar aprotic solvent is used to remove the organic ligands from the nanocrystals. The polar aprotic solvent may include acetonitrile (ACN), DMF, HMPA, or a combination thereof. In one embodiment, the solution includes a concentration of trialkyloxonium salt of about 1 millimolar (mM) to about 100 mM. In one embodiment, films are gently washed up to 5 times with ACN followed by hexanes. The organic ligands may be removed by washing or rinsing the film. In one embodiment, the substrate and film are soaked in the solution including the trialkyloxonium salt. In one embodiment, Meerwein's salt (Et$_3$OBF$_4$) is used. However, use of other trialkyloxonium salts is also possible. In one embodiment, the polar aprotic solvent is N,N-dimethylformamide (DMF). In another embodiment, the polar aprotic solvent is acetonitrile. Other polar aprotic solvents may also be used. For ligand stripping with co-solvents, DMF or HMPA with a concentration of 0.1-3 M in ACN may be used in one embodiment. In one example, a PbSe film is soaked in an ACN solution of Et$_3$OBF$_4$ or NOBF$_4$ for a time period (e.g., 2 minutes, 5 minutes, 10 minutes, etc.). The solution may include, for example, 1-100 millimolar (mM) of Et$_3$OBF$_4$ or 1-100 mM of NOBF$_4$.

At block 225, a determination is made as to whether a sufficient amount of ligands have been removed from the nanocrystal surfaces. If not enough ligands have been removed from the nanocrystals, the method proceeds to block 230, and the operations of block 220 are repeated. If a sufficient amount of ligands have been removed from the nanocrystals, the method ends. In one embodiment, all ligands are to be removed from the nanocrystals. Multiple layers may be deposited to build up the film thickness. Ligand stripping may be performed after each subsequent layer is deposited.

Due to the efficient removal of insulating oleate ligands, favorable effects on the electronic properties of the treated films are exhibited. Initial PbSe-OA films are not conductive, even after extensive washing with ACN. Conversely, oleate-stripped PbSe films are found to exhibit p-type conductivity, with $\sigma=(1.5\text{-}5.8)\times10^{-2}$ Siemens per centimeter (S/cm) when measured in air. These values were comparable to PbSe-OA films treated with amines upon exposure to air ($\sigma=1\times10^{-3}\text{-}5\times10^{-1}$ S/cm), which results in highly conductive p-type films due to evaporation of absorbed amine molecules and subsequent doping by oxygen, hydroxyl, and water. This demonstrates the ability to rapidly increase transport in films of chalcogenide nanocrystals without annealing, sintering, etching, or the use of hazardous chemical treatments, such as anhydrous hydrazine. A summary of particle size and electrical properties for PbSe-OA and $Et_3OBF_4$-treated PbSe Films is shown in table 1 below.

TABLE 1

Particle Size & Electrical Measurements for PbSe-OA and $Et_3OBF_4$-treated PbSe Films.

| Film | Size [nm] | $\sigma$ [S/cm] | Carrier Concentration [$cm^{-3}$] | Mobility [$cm^2 V^{-1} s^{-1}$] |
|---|---|---|---|---|
| PbSe-OA | 7.0 (10.1) | N/A | N/A | N/A |
| ACN | 7.1 (9.5) | $1.5 \times 10^{-2}$ | $2.3 \times 10^{16}$ | 4.1 |
| DMF/ACN | 7.1 (7.9) | $5.8 \times 10^{-2}$ | $1.4 \times 10^{18}$ | 2.6 |
| HMPA/ACN | 7.1 (8.3) | $2.7 \times 10^{-2}$ | $6.9 \times 10^{17}$ | 2.5 |

Figure 4A:
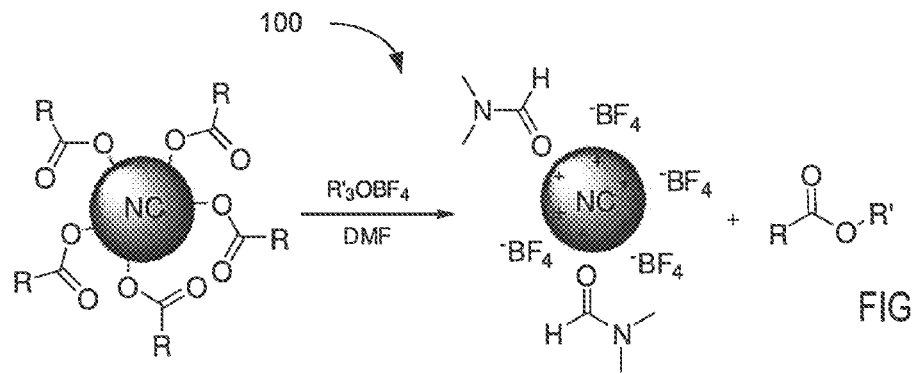
FIG. 4A illustrates reactive ligand stripping of carboxylate-coated nanocrystals using trialkyloxonium salts, in accordance with embodiments of the present invention.

FIG. 4A illustrates reactive ligand stripping 100 of carboxylate-coated nanocrystals using trialkyloxonium salts, in accordance with embodiments of the present invention. Ligand stripping 100 of a carboxylate-coated nanocrystal is shown using a solution of $R'_3OBF_4$ in DMF. Examples of nanocrystals that may be carboxylate-coated include CdSe, CdSe/CdS, PbSe, $TiO_2$, $\alpha\text{-}Fe_2O_3$, doped or undoped ZnO, doped or undoped $NaYF_4$, and so on.

Figure 4B:
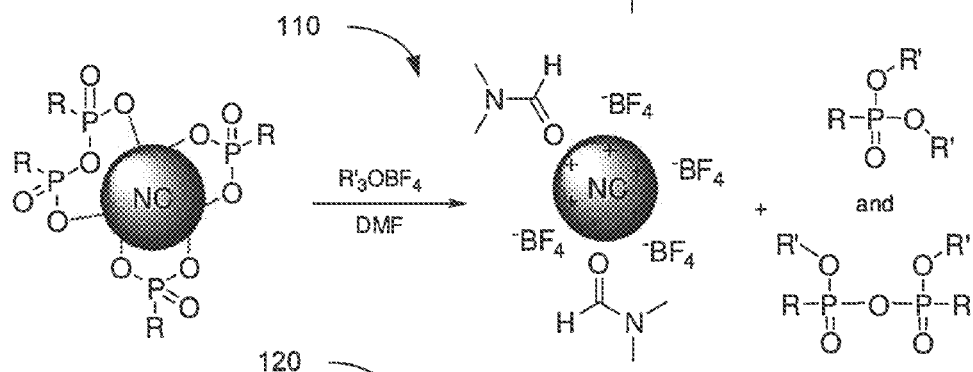
FIG. 4B illustrates reactive ligand stripping of phosphonate-coated nanocrystals using trialkyloxonium salts, in accordance with embodiments of the present invention.
Figure 4C:
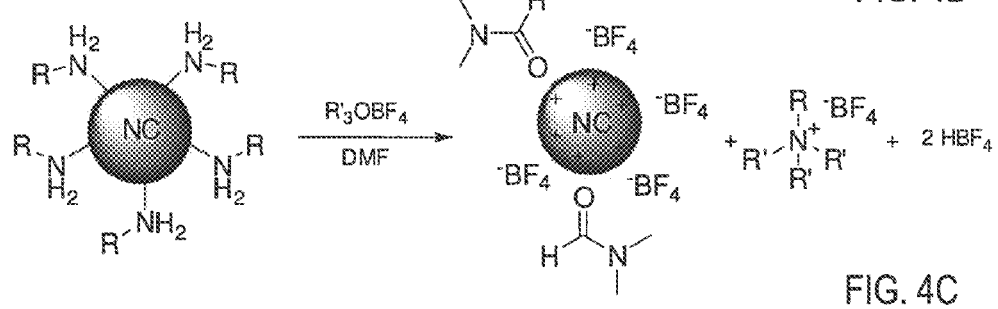
FIG. 4C illustrates reactive ligand stripping of amine-coated nanocrystals using trialkyloxonium salts, in accordance with embodiments of the present invention.

FIG. 4B illustrates reactive ligand stripping 110 of phosphonate-coated nanocrystals using trialkyloxonium salts, in accordance with embodiments of the present invention. Ligand stripping 110 of a phosphonate-coated nanocrystal is shown using a solution of $R'_3OBF_4$ in DMF. Examples of nanocrystals that may be phosphonate-coated include CdSe, CdSe/ZnS, and so on. FIG. 4C illustrates reactive ligand stripping 120 of amine-coated nanocrystals using trialkyloxonium salts, in accordance with embodiments of the present invention. Ligand stripping 120 of an amine-coated nanocrystal is shown using a solution of $R'_3OBF_4$ in DMF. Examples of nanocrystals that may be amine-coated include $In_2O_3$, Ag, FePt, and so on.

By employing trialkyloxonium salts, embodiments exploit their superior alkylating character to rapidly and efficiently remove a broad spectrum of native ligand types while leaving the surface of the nanocrystal bare, with anions (e.g., tetrafluoroborate ($BF_4^-$) or hexafluorophosphate ($PF_6^-$)) weakly coordinating through electrostatic interactions in their place. Trialkyloxonium salts are unreactive toward inorganic constituents such as chalcogenides. Accordingly, trialkyloxonium salts can be used to remove ligands from a broad spectrum of nanocrystals, enabling more robust chemical treatments to activate nanocrystal surfaces. The ability to remove insulating ligands quickly and homogeneously with no subsequent annealing should present robust, new paths for fabricating large area thin film devices.

FIG. 5A illustrates measurements of a thin film before and after ligands have been stripped from the surfaces of nanocrystals of the thin film, in accordance with one embodiment. More specifically, FIG. 5A shows an analysis 500 using energy dispersive x-ray spectroscopy (EDS) of a film having oleate-coated lead selenide nanocrystals (PbSe-OA) before 505 and after 510 rinsing with a solution including Meerwein's salt and acetonitrile. The analysis of the $Et_3OBF_4$-treated nanocrystal films shows drastic reduction in the carbon signal relative to PbSe-OA.

FIG. 5B further identifies molecules left at the stripped PbSe surface, as detected by a Fourier transform infrared spectroscopy (FT-IR) analysis 550. As shown, PbSe-OA nanocrystal thin films 555 exhibit diagnostic signals for oleate ligands around 2900 $cm^{-1}$ (symmetric and antisymmetric CH stretches) and 1450 $cm^{-1}$ (symmetric and antisymmetric carbonyl stretches). After treatment with $Et_3OBF_4$ in MeCN 560, these signals are completely absent. No stretch attributed to $BF_4^-$ is present at 1080 $cm^{-1}$. Also, for PbSe-OA thin films treated with Meerwein-activated DMF 565, signals attributed to surface-adsorbed DMF are not present, as no carbonyl stretch is observed around 1650 $cm^{-1}$.

Collectively, the absence of signals attributed to $BF_4^-$ and solvent molecules by EDS and FT-IR analysis suggests that the co-solvent and counter ion are not involved in passivation of stripped PbSe nanocrystal surfaces. These results may be due to desorption of Pb adatoms upon ligand stripping. Indeed, inductively coupled plasma atomic emission spectroscopy (ICP-AES) reveals that PbSe-OA nanocrystals stripped with $Et_3OBF_4$ have a nearly equimolar ratio of Pb:Se (0.97:1.00), while the initial samples may possess the expected lead rich ratio of 1.22:1.00.

FIGS. 6A-C illustrate additional measurements of a thin film before and after ligands have been stripped from the surfaces of nanocrystals in the thin film, in accordance with one embodiment. FIGS. 6A-C show that ligand stripping using trialkyloxonium salts does not cause significant change to the size or structure of PbSe nanocrystals. To elucidate any changes on crystallinity, X-ray diffraction (XRD) patterns 600 are shown for the PbSe films. Line 605 shows XRD patterns for PbSe-OA nanocrystals. Line 610 shows XRD patterns for PbSe-OA nanocrystals after ligand stripping with MeCN. Line 615 shows XRD patterns for PbSe-OA nanocrystals after ligand stripping with DMF/MeCN. Line 620 shows XRD patterns for PbSe-OA nanocrystals after ligand stripping with HMPA/MeCN. As shown, diffraction patterns for both initial and ligand-stripped PbSe particles are consistent with a rock salt structure. The Scherrer formula may be used to calculate the crystallite size, the results of which are summarized above in Table 1. The initial coherent domain size, calculated to be 10.1 nm, is similar after ligand stripping (9.5-7.9 nm). Considering the many factors contributing to broadening of diffraction peaks, the corresponding absorption spectra 630, 650 are also shown in FIG. 6B and FIG. 6C, respectively. Calculation of PbSe diameter from the first exciton peak reveals less than 0.1 nm difference in size after stripping, confirming that no fusing nor etching of oleate stripped particles occurs, aside from the noted loss of excess surface Pb adatoms.

In summary, Meerwein's and related trialkyloxonium salts have been presented as a universal class of reagents for ligand stripping of carboxylate-, phosphonate- or amine-coated nanocrystals. Quantitative ligand removal may be readily obtained for several important semiconductor types, including PbSe, doped ZnO and CdSe-based heterostructures. In the atypical case of PbSe, no evidence of surface passivation by either $BF_4^-$ or solvent molecules is exhibited. Additionally, desorption of Pb(II) adatoms accompanies ligand removal.

Rapid yet mild ligand stripping by trialkyloxonium salt such as Meerwein's salt as shown here results in highly conductive PbSe films with hole mobilities as high as 4 square centimeters per volt second ($cm^2$ $V^{-1}$ $s^{-1}$) without need for additional treatments. Other nanocrystal compositions also show evidence for weak adsorption of anion and solvent species, consistent with the retention of surface adatoms. These surface-adsorbed species facilitate stable colloidal dispersions in polar solvents and are amenable to subsequent ligand modification. Collectively, these qualities make Meerwein's and other trialkyloxonium salts highly versatile chemical agents for control of nanocrystal solubility and surface properties, which should lead to improved manipulation of nanocrystal surface composition for desired applications.

Figure 7:
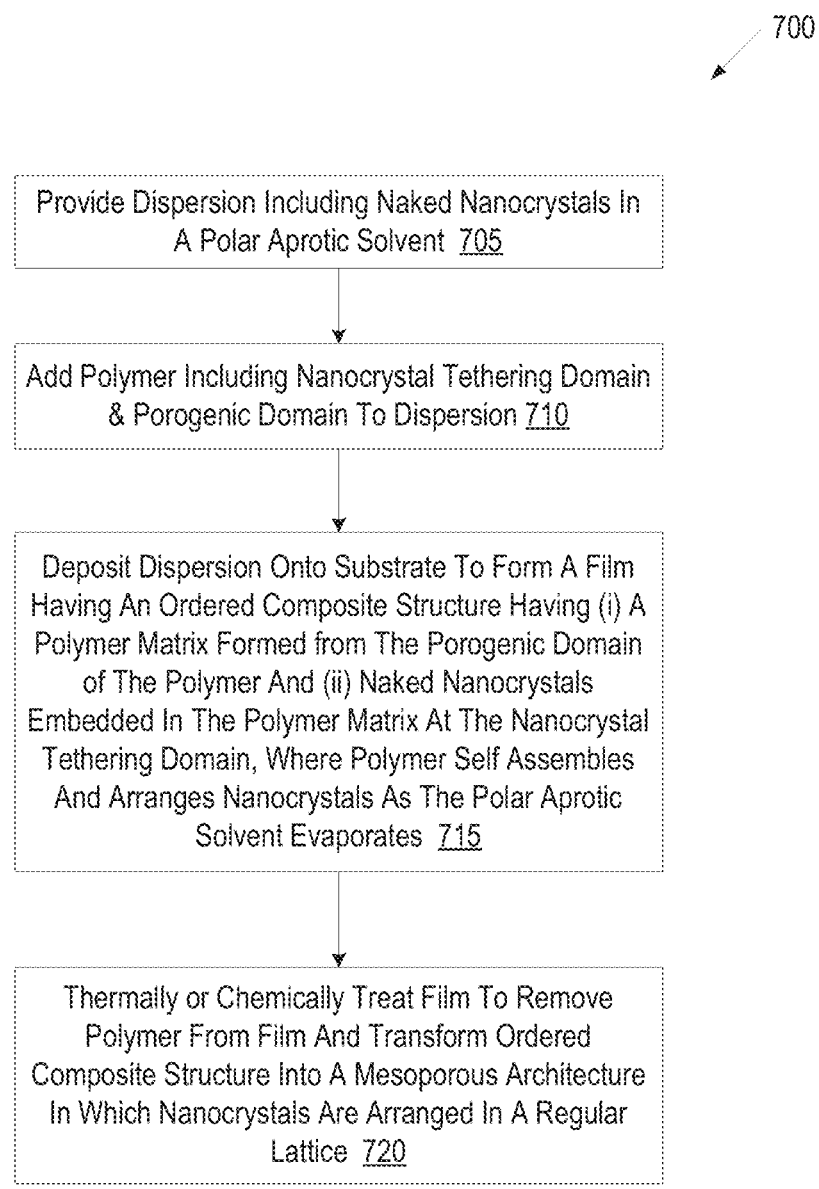
FIG. 7 is a flow chart illustrating a method of forming a film having a mesoporous architecture that includes naked nanocrystals, in accordance with one embodiment.

FIG. 7 is a flow chart illustrating a method 700 of forming a film having a mesoporous architecture that includes naked nanocrystals, in accordance with one embodiment. At block 705 of method 700, a dispersion including naked nanocrystals in a polar aprotic solvent is provided. The naked nanocrystals are ligand-stripped nanocrystals having cationic surfaces. NCs of diverse size, shape, and composition may be used. Examples of nanocrystals that may be used include oxides (e.g., $TiO_2$, $CeO_2$, and ITO), nanophosphors (e.g., Yb and Er-doped $NaYF_4$) and metal alloys (e.g., FePt). Additionally, combinations of different nanocrystals may be used. For example, manganese oxide and indium tin oxide nanocrystals may be used together. The polar aprotic solvent may include N,N-dimethyl formamide (DMF), hexamethylphosphoramide (HMPA), acetonitrile, dichloromethane, or a combination thereof.

DMF may be added to the dispersion. The DMF may attach to some regions of the surfaces of the nanocrystals in place of a polymer attaching to those regions. After the dispersion is deposited, the DMF evaporates, exposing those regions to which the DMF was attached. These regions may then attach to exposed regions of other nanocrystals. Some level of agglomeration can be beneficial, as it can increase electrical conductivity of a resultant film.

At block 710, a polymer including a nanocrystal tethering domain and a porogenic domain is added to the dispersion. The polymer may be in a solution including another polar solvent. The polar solvent may be DMF, acetonitrile, dichloromethane, or another polar solvent. The solution and dispersion may be mixed together. Combining the solution and dispersion may cause the nanocrystals and polymer to form a stable nanocrystal/polymer dispersion. The polymer may affect the level of agglomeration (also referred to as phase separation). For example, polymers that interact more strongly with nanocrystal surfaces can mitigate phase separation.

In one embodiment, block copolymers are used to decrease agglomeration (increase phase separation). A block copolymer is a polymer with at least two distinct microdomains. One end of the block copolymer may provide the nanocrystal tethering domain. Examples of polymers that may be used for the nanocrystal tethering domain include polymers that are attracted to surfaces of the nanocrystals, such as poly(N,N-dimethylacrylamide) (PDMA), poly(N,N-dimethylacrylamide-co-acrylic acid), polyoxazalines, polypeptoids, and poly(vinylpyridines), poly(acrylic acid), and so on. PDMA may mimic the chemical structure of DMF. At least one microdomain of the block copolymer may provide the porogenic domain. Examples of polymers that may provide the porogenic domain include homomeric polyisoprene, polybutadiene, polyacrylates, polymethacrylates, polystyrene (PS), polynorbornenes, polyesters, polyethers, polycarbonates, polyethylene, branched polyethylene, polypropylene, and so on, as well as copolymers therefrom. Example copolymers that may be used for the porogenic domain include polyethylene butylene, copolymers of polyethylene with other olefins (alpha-olefins, norbornenes, etc.). For example, to possible copolymers that may be used for the porogenic domain are poly(ethylene-co-1-butene) and poly(ethylene-co-norbornene).

The nanocrystal tethering domain end of the block copolymer may attach to the surface of the nanocrystals and prevent them from clumping (e.g., promote microphase separation) and keep them well dispersed in the polymer matrix. For example, the PDMA block of the block copolymer PS-b-PDMA mimics DMF, interacting favorably with the NC surfaces. Accordingly, use of the block copolymer and/or DMF may be used to control the self-assembly of nanocrystals in the polymer matrix at deposition.

In one embodiment, the provided block copolymer is PS-b-PDMA that has been synthesized via RAFT polymerization of a $HO_2C$-PDMA-TCC macro chain transfer agent with styrene. In one embodiment, a solution of DMA, 2,2-Dimethoxypropane (DMP), Azobisisobutyronitrile (AIBN) and 1,4 dioxane is mixed, degassed and heated. The mixture may be degassed and sealed under nitrogen and then heated at 70 degrees C. for up to an hour in one embodiment. After quenching with liquid nitrogen, a resulting viscous polymerization mixture may be dissolved in acetone and precipitated into cold hexanes. The polymer may then be filtered and dried in vacuo. A solution of $HO_2$-ODMA-TCC macro-CTA and styrene may then be degassed, sealed under nitrogen and heated to form a chain reaction mixture. In one embodiment, the solution is heated at around 110 degrees C. up to 24 hours. After quenching with liquid nitrogen, the chain reaction mixture may be dissolved with acetone and precipitated into cold hexanes.

At block 715, the dispersion is deposited onto a substrate to form a nanocomposite film having a solid polymer matrix with nanocrystals dispersed in the solid polymer matrix. In the film, the polymer matrix is formed from the porogenic domain of the polymer, and the ligand-stripped nanocrystals coat or are embedded in the polymer matrix at the nanocrystal tethering domain. The substrate onto which the solution is deposited may be glass, quartz, silicon, plastic, ITO, or fluorine-doped tin oxide slides, for example.

In one embodiment, the polymer self-assembles and arranges the nanocrystals into a lattice as the polar solvent evaporates. Self-assembly can be utilized to influence electrical properties, as interparticle contact and distances between nanocrystals affect electron transport. The use of DMF moderates microphase separation. DMF strongly interacts with the bare nanocrystal surfaces, and appears to compete with the polymer as a passivating agent. As solvent leaves the film during evaporation, nanocrystal surfaces are exposed, inducing microphase separation of the nanocrystals. Multilayer deposition may be used to increase film thickness.

At block 720, the film is chemically or thermally treated to remove the polymer from the film. In one embodiment, the film is annealed at a temperature of above 300 degrees C. under Ar, $N_2$, or $O_2$. Removal of the polymer from the film transforms the ordered composite structure into a mesoporous architecture in which nanocrystals are arranged in a regular lattice. The resulting mesoporous architectures have well-defined periodicity over large areas. This long-range ordering may be achieved at intermediate NC/BCP ratios. High NC loading may result in loss of periodicity while low NC loading may result in a worm-like morphology.

The dimensionality of a wall of the film having the mesoporous architecture may be controlled by selecting various parameters during the solution processing. In one embodiment, dimensionality of the wall is controlled first by choice of a volume fraction of the polymer that provides the nanocrystal tethering domain and second by a choice of a volume fraction of the polymer that provides the porogenic domain. The size of the wall may be increased by increasing the volume fraction of the polymer that provides the nanocrystal tethering domain. In one embodiment, the dimensionality of the wall is controlled by controlling a volume fraction of the nanocrystals to a volume fraction of the polymer. Increasing the volume fraction of the nanocrystals may increase the wall size.

Figure 8:
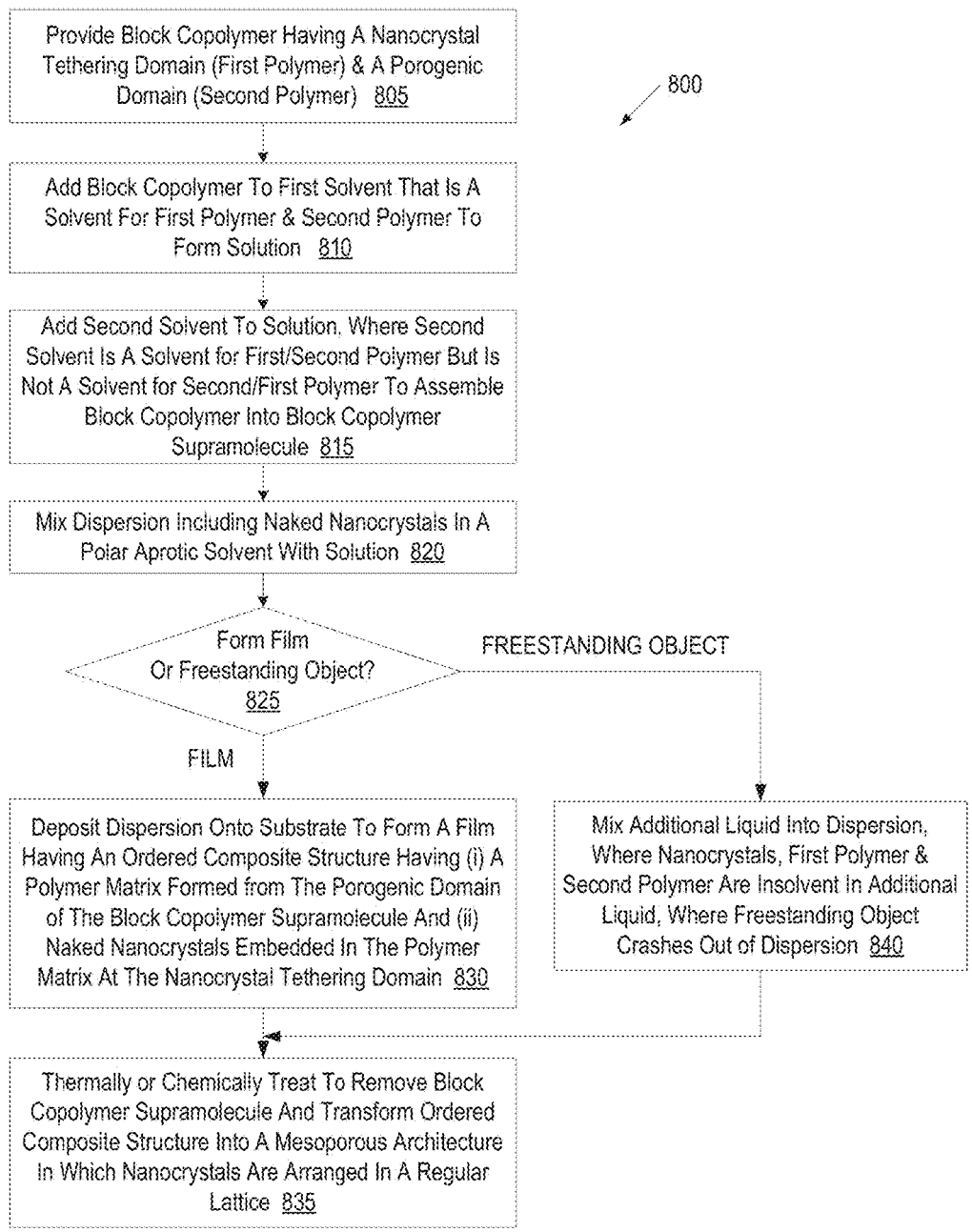
FIG. 8 is a flow chart illustrating a method of forming a film or freestanding object having a mesoporous architecture that includes naked nanocrystals, in accordance with one embodiment.

FIG. 8 is a flow chart illustrating a method 800 of forming a film or freestanding object having a mesoporous architecture that includes naked nanocrystals, in accordance with one embodiment. At block 805 of method 800, a block copolymer having a at least one nanocrystal tethering domain and at least one porogenic domain is provided. The nanocrystal tethering domain is provided by a first polymer microdomain, and the porogenic domain is provided by a second polymer microdomain. The first polymer microdomain may be poly(N,N-dimethylacrylamide) (PDMA), poly(N,N-dimethylacrylamide-co-acrylic acid), polyoxazalines, polypeptoids, and poly(vinylpyridines), poly(acrylic acid), and so on. PDMA may mimic the chemical structure of DMF. Examples of polymers that may provide the porogenic domain include homomeric polyisoprene, polybutadiene, polyacrylates, polymethacrylates, polystyrene (PS), polynorbornenes, polyesters, polyethers, polycarbonates, polyethylene, branched polyethylene, polypropylene, and so on, as well as copolymers therefrom, for example polyethylene butylene. The block copolymers (BCPs) may strongly adsorb to naked NC surfaces, thus driving the ordered assembly of NCs in a general way, where different compositions, sizes, and shapes can be assembled using the same BCP chemistry. In one embodiment, the BCP contains a NC-tethering domain consisting of poly(N,N-dimethylacrylamide) (PDMA), which was chosen to mimic the dynamic adsorption interactions of N,N-dimethylformamide (DMF) at bare NC surfaces, alongside a porogenic polystyrene (PS) domain.

At block 810, the block copolymer is added to a first solvent that is a solvent for the first polymer and for the second polymer to form a solution. The first solvent includes DMF in one embodiment.

At block 815, a second solvent is added to the solution. The second solvent is a solvent for one of the first polymer or the second polymer, but is not solvent for the other polymer. For example, the second solvent may be solvent for the first polymer and non-solvent for the second polymer. Alternatively, the second solvent may be solvent for the second polymer but non-solvent for the first polymer. The second solvent may be water, methanol, or ethanol, for example. Addition of the second solvent to the solution causes the block copolymer to preassemble into a block copolymer supramolecule (e.g., into a micelle). In one embodiment, the first solvent is DMF and the second solvent is ethanol. The final solution may include 20% volume over volume (v/v) DMF in ethanol. The solution may be stirred for a time period (e.g., for 1 hour, 2 hours, 4 hours, 6 hours, 12 hours, 24 hours, 48 hours, etc.) to facilitate the formation of the block copolymer supramolecules.

At block 820, a dispersion including naked nanocrystals in a polar aprotic solvent is mixed with the solution that includes the preassembled block copolymer supramolecules. This mixture may be stirred for a time period. The time period may be 4 hours, 8 hours, 12 hours, 24 hours, 48 hours, or some other time period. When DMF is included in the solvent mixture (e.g. 20% DMF in ethanol), the co-assembled supramolecules (e.g., NC-decorated PDMA-b-PS micelles) remain stably suspended in the solution. At block 825, a determination is made as to whether a film or a freestanding object is to be formed. If a film is to be formed, the method continues to block 830. If a freestanding object is to be formed, the method proceeds to block 840.

At block 830, the dispersion is deposited onto a substrate to form a nanocomposite film having a solid polymer matrix with nanocrystals dispersed in the solid polymer matrix. In the film, the polymer matrix is formed from the porogenic domain of the polymer, and the naked nanocrystals are embedded in the polymer matrix at the nanocrystal tethering domain. The substrate onto which the solution is deposited may be glass, quartz, NaCl, silicon, plastic, ITO, or fluorine-doped tin oxide (FTO), for example. Any deposition technique may be used, such as spin coating, dip coating, extrusion, doctor blade, and so on. Multilayer deposition may be used to increase film thickness.

At block 840, an additional liquid is added to the dispersion including the block copolymer supramolecules and the ligand-stripped nanocrystals. The nanocrystals and one or both polymers of the block copolymer supramolecule may be insolvent in the additional liquid. Accordingly, an article that includes an ordered composite of the block copolymer supramolecule and the nanocrystals crashes out of the dispersion. For example, precipitation of macroscopic assemblies occurs when DMF is substituted by an apolar solvent, such as toluene.

At block 840, the film or freestanding object is chemically or thermally treated to remove the polymer from the film. Removal of the polymer from the film transforms the ordered composite structure into a mesoporous architecture in which nanocrystals are arranged in a regular lattice. In one embodiment, mesoporous NC films and/or freestanding objects are realized by annealing in air, Ar, $N_2$, or $O_2$ to remove the BCP structure directing agent. In one embodiment, the article is annealed at a temperature between 300 degrees C. and 550 degrees C. for a time period.

The freestanding object may be a powder that is an architected composite of polymer and nanocrystals. This powder may be used to perform any number of polymer processing and/or composite processing operations. Such operations may yield a nanocomposite pellet that can be easily extruded. The pellet or powder may be arranged into a desired shape, and may then be thermally treated to remove the polymer and cause the nanocrystals to link at their interfaces.

Figure 9:
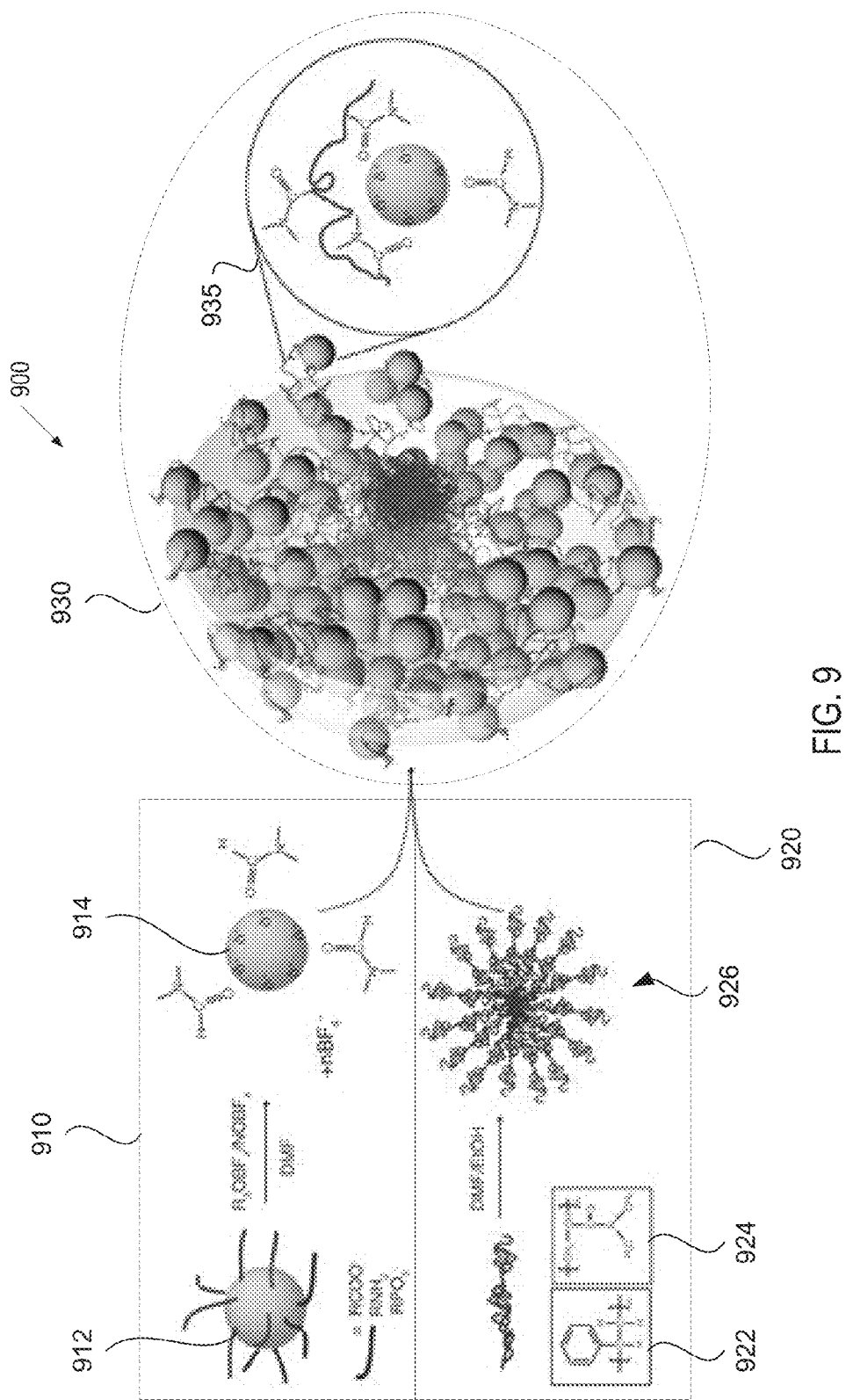
FIG. 9 illustrates assembly of ligand-stripped (naked) nanocrystals with a block copolymer supramolecule, in accordance with embodiments of the present invention.

FIG. 9 illustrates assembly of ligand-stripped (naked) nanocrystals with a block copolymer supramolecule, in accordance with embodiments of the present invention. In the illustrated embodiment, nanocrystal ligand stripping 910 is shown by combining ligand-coated nanocrystals 912 with a solution of $R_3OBF_4$ and/or $NOBF_4$ to yield ligand-stripped nanocrystals 914. Additionally, block copolymer synthesis 920 is shown by combining PS 922 and PDMA 924 in a solution of DMF and/or EtOH to yield a BCP 926 containing a NC-tethering domain consisting of poly(N,N-dimethylacrylamide) (PDMA) alongside a porogenic polystyrene (PS) domain. The BCP 926 and naked nanocrystals 914 are then combined to form a nanocomposite structure 930 in which naked nanocrystals are bound to the BCP at the nanocrystal tethering domain, as shown in view 935.

The properties of mesoporous materials rely on control of their composition, pore dimensions, wall thickness, and the size and shape of the crystallite building units. Research has typically focused on tuning one of these parameters, with no reports demonstrating control over all of them. Embodiments show that the use of ligand-stripped nanocrystals (NCs) produces mesoporous materials where all of these parameters are controlled to give ordered architectures. In one embodiment, a new class of block copolymer (BCP) structure directing agents, which are designed to enhance the enthalpy of adsorption to the naked surfaces of NCs are used. This enables the assembly of NCs whose compositions range from metal oxides (Sn-doped $In_2O_3$ or ITO, $CeO_2$, $TiO_2$) to metal fluorides (Yb,Er-doped $NaYF_4$) and metals (FePt). Embodiments vary the metrics (pore size and wall thickness) of mesoporous ITO architectures, such that the length scale of ordering changes from 33 to 46 nm, for each crystallite size of 4.5, 6, and 8 nm. Spherical and rod-shaped crystallites can be assembled using the same strategy to give mesoporous $TiO_2$ architectures with even larger structural features of 54 nm. These nanorod-based mesoporous $TiO_2$ films exhibit outstanding durability (>1000 cycles) under electrochemical cycling—performance highly sought after in energy storage materials. The control that embodiments offer over crystallite size and shape, composition, and phase are not generally possible under previous techniques for nanocrystal article fabrication.

All the dimensions in the described mesoporous architectures can be controlled through selection of the building blocks. In general, the NC size and shape, established through colloidal synthesis, persists through assembly and annealing, thereby determining the constituent crystallite size. Meanwhile, varying the weight average ($M_w$) of the BCP domains systematically changes the periodicity. The $M_w$ of the PDMA block tunes the wall thickness while the $M_w$ of the PS block tunes the mesopore dimensions, as shown in Table 2. Table 2 shows periodicity as derived from grazing incidence small angle X-ray scattering (GISAXS) line scans as well as pore size and wall thickness for various mesoporous architectures with 4.5 nm ITO nanocrystals.

TABLE 2

Metrics variation of mesoporous ITO architectures of 4.5 nm nanocrystals.

| BCP | Periodicity (nm) | Pore size (nm) | Wall thickness (nm) |
|---|---|---|---|
| $PDMA_{10k}$-b-$PS_{60k}$ | 42 | 33 ± 5 | 10 ± 3 |
| $PDMA_{20k}$-b-$PS_{60k}$ | 46 | 34 ± 5 | 14 ± 3 |
| $PDMA_{20k}$-b-$PS_{20k}$ | 33 | 23 ± 3 | 13 ± 3 |

Controlling co-assembly of BCPs with NCs relies on the balance between enthalpic gain due to BCP-NC chemical interactions ($\Delta H_{BCP-NC}$), and entropic penalty, which is due primarily to the loss of conformational entropy of polymeric chains when stretching to incorporate NCs ($\Delta S_{BCP}$). $\Delta S_{BCP}$ has been demonstrated, in both theoretical and experimental results, to depend on the ratio of NC diameter (d) to the size of the polymer domain with which the NCs interact, specifically its root-mean-squared end-to-end distance ($R_0$). At larger $d/R_0$, the entropic cost of co-assembly increases due to more severe conformational restriction of the polymer chains. Hence, based on entropic trends, theory predicts poorer ordering as $R_{0,PDMA}$ becomes smaller, keeping NC size fixed. Contrary to this expectation, embodiments show improved ordering for shorter PDMA chains, an effect which is most apparent for larger NCs (e.g. 6 or 8 nm ITO). This suggests that a strong enthalpic driving force deriving from the adsorption of PDMA on the naked NC surfaces ($\Delta H_{BCP-NC}$) is dominating the assembly process. Evidence of PDMA adsorption was found in the variable shift in the frequency of the carbonyl stretching vibration, as shown below in FIG. 15.

The approach discussed in embodiments offers unprecedented simultaneous control of structure on multiple length scales within mesoporous architectures. As such, further systematic variations, e.g., in crystallite size and dimensions of the mesoporous channels, will afford a comprehensive understanding of the key parameters controlling energy storage performance. The same approach can be used to rationalize the roles of porosity and crystallite size/shape on the performance of dye-sensitized solar cells, photoelectrochemical cells, electrochromic devices, or catalytic materials based on mesoporous materials. Finally, since PDMA can adsorb to all variety of ligand-stripped NCs, the enthalpy-driven assembly approach described in embodiments offers a universal strategy that can be used to understand the performance of mesoporous materials across an even wider range of applications.

To tune mesoscale architectures, several PDMA-b-PS BCP structure directing agents with different molecular weights and block ratios may be prepared by reversible addition-fragmentation chain transfer (RAFT) polymerization. Table 3 below shows a sample of BCPs that may be used. More specifically, table 3 shows number average ($M_n$) and weight average ($M_w$) molecular weights and polydispersity indices (PDI=$M_w/M_n$) for various homopolymers and block copolymers synthesized via RAFT polymerization. In polar solvents, these BCPs may form supramolecules or micelles with a PDMA corona so that ligand-stripped NCs decorate the periphery when added to a solution of preformed micelles.

TABLE 3

Properties of block copolymers.

| Polymer | $M_n$ | $M_w$ | PDI |
|---|---|---|---|
| $PDMA_{10k}$ | 8,410 | 9,440 | 1.12 |
| $PDMA_{20k}$ | 17,040 | 19,790 | 1.16 |
| $PS_{50k}$ | 52,360 | 57,100 | 1.09 |
| $PDMA_{10k}$-b-$PS_{60k}$ | 58,560 | 70,590 | 1.2 |
| $PDMA_{20k}$-b-$PS_{20k}$ | 32,810 | 42,530 | 1.3 |
| $PDMA_{20k}$-b-$PS_{60k}$ | 63,460 | 82,500 | 1.3 |
| $PS_{50k}$-b-$PDMA_{60k}$ | 64,540 | 87,510 | 1.36 |

FIGS. 10A-F illustrate measurements of dispersions containing ITO and/or PDMA-b-PS, in accordance with one embodiment. In particular, FIGS. 10A-B show TEM analysis 1005, 1010, respectively, corresponding to $PDMA_{20k}$-b-$PS_{60k}$ and FIG. 10C shows DLS analysis 1015 corresponding to $PDMA_{20k}$-b-$PS_{60k}$. TEM analysis 1005 shows the $PDMA_{20k}$-b-$PS_{60k}$ solution, and TEM analysis 1010 shows the ITO/$PDMA_{20k}$-b-$PS_{60k}$ solution. DLS analysis 1015 shows particle sizes 1016 for the $PDMA_{20k}$-b-$PS_{60k}$ solution and particle sizes 1018 for the ITO/$PDMA_{20k}$-b-$PS_{60k}$ solution.

FIGS. 10D-E show TEM analysis 1020, 1025, respectively, corresponding to $PDMA_{20k}$-b-$PS_{20k}$ and FIG. 10F shows DLS analysis 1030 corresponding to $PDMA_{20k}$-b-$PS_{20k}$. TEM analysis 1020 shows the $PDMA_{20k}$-b-$PS_{20k}$ solution, and TEM analysis 1025 shows the ITO/$PDMA_{20k}$- b-PS$_{20k}$ solution. DLS analysis 1030 shows particle sizes 1032 for the PDMA$_{20k}$-b-PS$_{20k}$ solution and particle sizes 1034 for the ITO/PDMA$_{20k}$-b-PS$_{20k}$ solution.

FIGS. 11A-F illustrate measurements of additional dispersions containing ITO and PDMA-b-PS, in accordance with one embodiment. In particular, FIGS. 11A-B show TEM analysis 1105, 1110, respectively, corresponding to PDMA$_{10k}$-b-PS$_{60k}$ and FIG. 11C shows DLS analysis 1115 corresponding to PDMA$_{10k}$-b-PS$_{60k}$. TEM analysis 1105 shows the PDMA$_{10k}$-b-PS$_{60k}$ solution, and TEM analysis 1110 shows the ITO/PDMA$_{10k}$-b-PS$_{60k}$ solution. DLS analysis 1115 shows particle sizes 1116 for the PDMA$_{10k}$-b-PS$_{60k}$ solution and particle sizes 1118 for the ITO/PDMA$_{10k}$-b-PS$_{60k}$ solution.

FIGS. 11D-E show TEM analysis 1120, 1125, respectively, corresponding to PDMA$_{60k}$-b-PS$_{50k}$ and FIG. 11F shows DLS analysis 1130 corresponding to PDMA$_{60k}$-b-PS$_{50k}$. TEM analysis 1120 shows the PDMA$_{60k}$-b-PS$_{50k}$ solution, and TEM analysis 1125 shows the ITO/PDMA$_{60k}$-b-PS$_{50k}$ solution. DLS analysis 1130 shows particle sizes 1132 for the PDMA$_{60k}$-b-PS$_{50k}$ solution and particle sizes 1134 for the ITO/PDMA$_{60k}$-b-PS$_{50k}$ solution.

FIGS. 12A-D illustrate measurements of additional dispersions containing ITO and PS-b-PEO, in accordance with one embodiment. In particular, FIGS. 12A-C show TEM analysis 1205, 1210, 1215, respectively, corresponding to PS$_{40k}$-b-PEO$_{53k}$ and FIG. 12D shows DLS analysis 1220 corresponding to PS$_{40k}$-b-PEO$_{53k}$. TEM analysis 1205 shows the PS$_{40k}$-b-PEO$_{53k}$ solution, TEM analysis 1210 shows the ITO/PS$_{40k}$-b-PEO$_{53k}$ solution, and TEM analysis 1215 shows the ITO/PS$_{40k}$-b-PEO$_{53k}$ solution with the addition of 200 μL of toluene. DLS analysis 1220 shows particle sizes 1225 for the PS$_{40k}$-b-PEO$_{53k}$ solution, particle sizes 1230 for the ITO/PS$_{40k}$-b-PEO$_{53k}$ solution, and particle sizes for the ITO/PS$_{40k}$-b-PEO$_{53k}$ solution with the addition of toluene. Notably, while naked NCs are compatible with traditional PEO-based BCPs, the PEO interacts weakly with their surfaces and they do not decorate micelles of these polymers.

When the traditional structure directing agent PS-b-PEO was used in a solvent mixture of 20% DMF v/v in ethanol, no hydrodynamic size increase may be observed when NCs were added to the micelle solution. Rather a peak corresponding to the NC diameter may appear, as shown in DLS analysis 1220. The NC segregation is confirmed also by TEM analysis 1210. After the addition of toluene to the NC-BCP solution, NC-decorated micelles are observed at TEM analysis 1215. The addition of toluene further causes the hydrodynamic size of the PS-b-PEO micelles to increase, as shown in DLS analysis 1220. No size change occur when toluene is added to a solution of PS-b-PEO micelles alone. This excludes the possibility of any swelling of the micelles induced by toluene. The fact that the PEO-NC interactions are much weaker than the DMF-NC interactions makes the NC dispersion in solution energetically favorable and makes it unfavorable for the NCs to decorate the PEO corona. Therefore, it is useful to destabilize both the PEO corona and the NC surface by the addition of toluene to drive the NCs to the PEO block.

FIGS. 13A-I illustrates images of various mesoporous architectures having compositional diversity, in accordance with embodiments. FIG. 13A illustrates a top-view scanning electron microscope (SEM) image 1305 showing a mesoporous film of 4.5 nm ITO NCs. FIG. 13B illustrates a high-resolution SEM image 1310 and FIG. 13C illustrates a transmission electron microscopy (TEM) image 1315 that also show the mesoporous film of 4.5 nm ITO NCs. FIG. 13D illustrates a SEM image 1320 showing mesoporous films of 5 nm CeO$_2$ NCs. FIG. 13E illustrates a SEM image 1325 showing mesoporous film of 3×20 nm TiO$_2$ nanorods. FIG. 13F illustrates a SEM image 1330 showing a mesoporous film of 8 nm Yb,Er-doped NaYF$_4$. FIG. 13G illustrates a SEM image 1335 showing a mesoporous film of 3 nm FePt NCs. FIG. 13H illustrates a low resolution SEM image 1340 showing an ITO NC mesoporous film. FIG. 13I illustrates a TEM image 1345 showing a mesoporous ITO powder of 8 nm ITO NCs.

FIGS. 14A-D illustrate various mesoporous films having compositional diversity, in accordance with one embodiment. FIG. 14A illustrates GISAXS line scans of mesoporous films obtained by dip-coating 4.5 nm ITO NC-decorated micelles of PDMA$_{20k}$-b-PS$_{60k}$ (1405A), PDMA$_{10k}$-b-PS$_{60k}$ (1410A), and PDMA$_{20k}$-b-PS$_{20k}$ (1415A). FIGS. 14B-D illustrate conceptual diagrams 1405B, 1410B, 1415B that show separation between block copolymer supramolecules for PDMA$_{20k}$-b-PS$_{60k}$ (1405A), PDMA$_{10k}$-b-PS$_{60k}$ (1410A), and PDMA$_{20k}$-b-PS$_{20k}$ (1415A), respectively. The metrics of these films are reported in Table 3.

Figures 15A, 15B, 15C:
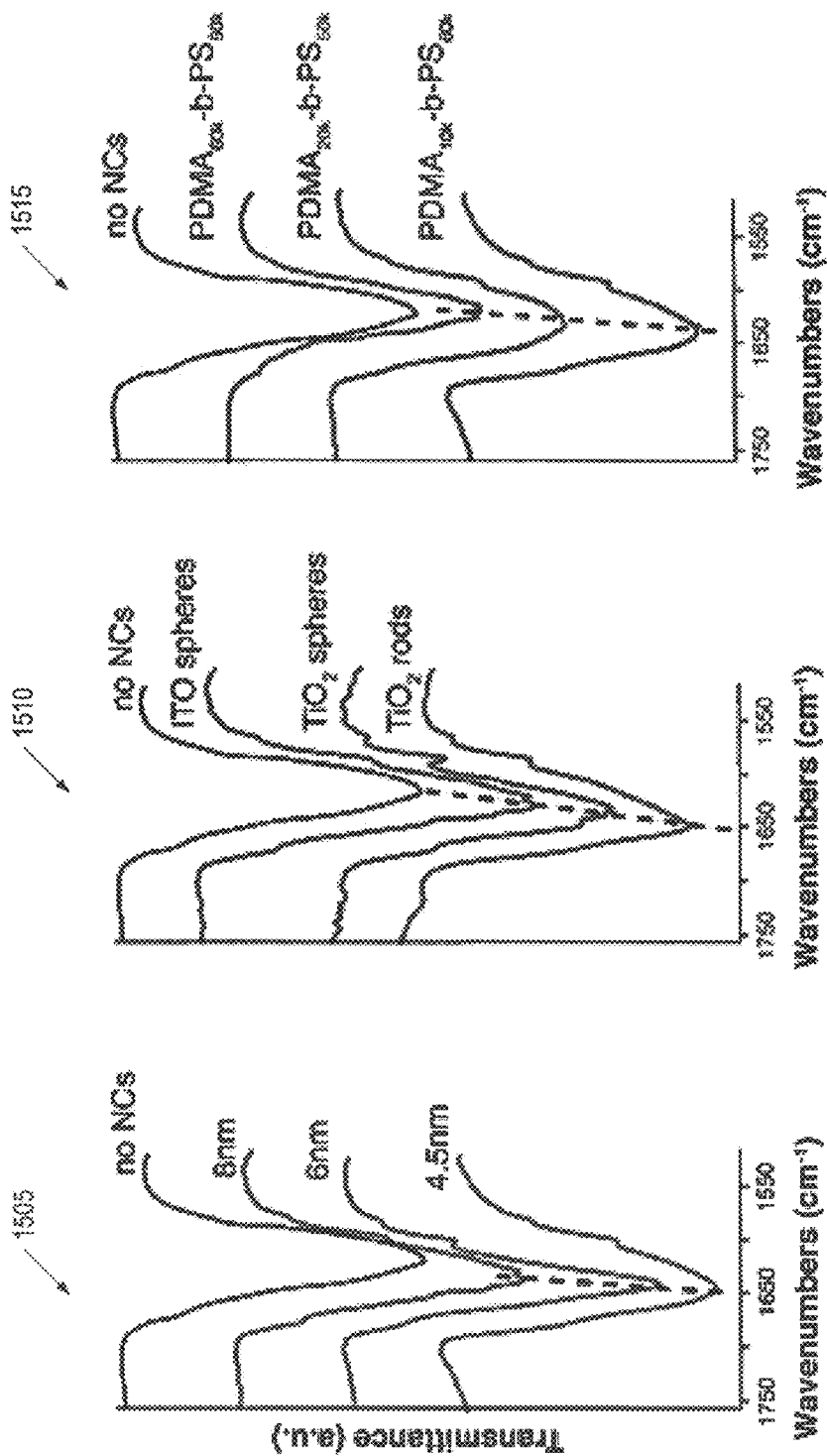
FIGS. 15A-C illustrate results of a spectroscopic study of block copolymer to nanocrystal interactions, in accordance with embodiments.

FIGS. 15A-C illustrate results of a spectroscopic study of BCP-NC interactions underlying enthalpy-driven assembly. Attenuated Total Reflectance Fourier Transform Infrared (ATR-FTIR) spectra 1505 of films combining PDMA$_{10k}$-b-PS$_{60k}$ with different size ITO NCs is shown in FIG. 15A. Additionally, ATR-FTIR spectra 1510 of films with ITO versus TiO$_2$ NCs of similar size (8 nm) or TiO$_2$ nanorods of larger specific surface area (3 by 20 nm) are shown in FIG. 15B. Additionally, ATR-FTIR spectra 1515 of films with different BCPs with the same ITO NCs (4.5 nm) is shown in FIG. 15C.

When NCs are introduced to BCP micelles, the carbonyl peak shifts systematically to higher frequency, eventually reaching a stable value around the same NC/BCP ratios that yield long-range ordering. We interpret this as the saturation of NC loading in the micelles' coronas. This is a useful indicator to identify an optimum weight fraction of NCs sufficient to create an ordered architecture using any given BCP. Furthermore, because there is no additional shift at higher NC/BCP ratio, this peak position is characteristic of a given combination of NC and BCP.

Figure 16:
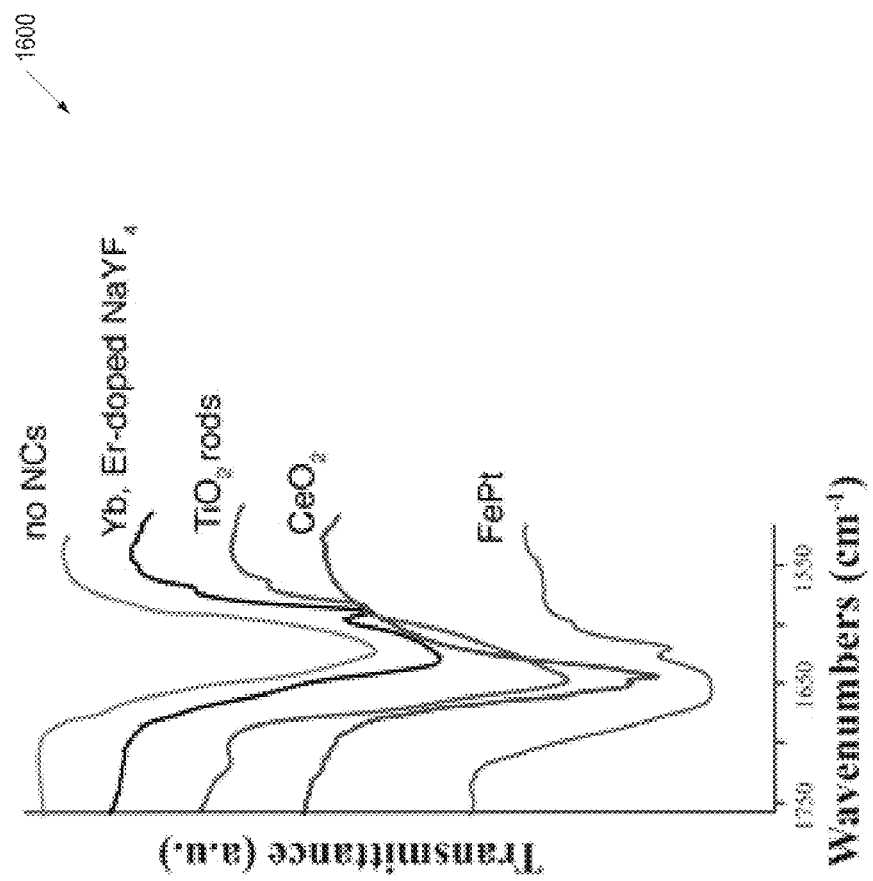
FIG. 16 is a spectroscopic study of additional block copolymer to nanocrystal interactions, in accordance with embodiments.

We interpret the shift of the carbonyl resonance as indicating the extent of PDMA adsorption at NC surfaces, which is correlated with $\Delta H_{BCP\text{-}NC}$. For instance, a bigger shift and a broader peak is found for higher NC surface area, as shown for smaller NCs in chart 1505, since more adsorption sites are available to coordinate with the PDMA amide groups. Small diameter TiO$_2$ nanorods (3 by 20 nm) present larger specific surface area than TiO$_2$ spheres (8 nm), which similarly results in a larger peak shift, as shown in chart 1510. Shorter PDMA chains likewise result in larger peak shifts in agreement with a higher fraction of PDMA monomers being tethered to NC surfaces, as shown in chart 1515. The shift of the carbonyl resonance may therefore be a sensitive probe of the enthalpic driving force for co-assembly. Keeping NC size and BCP M$_w$ fixed, apparent differences in adsorption enthalpy emerge for different NC compositions. For example, the higher frequency resonance for TiO$_2$ versus ITO suggests a larger adsorption enthalpy for the former in chart 1510. Additionally, small (3 nm) FePt NCs result in the highest observed carbonyl stretching frequency, as shown in chart 1610 for FIG. 16. In general, larger peak shifts correlate with improved ordering, consistent with enthalpy-driven assembly. Indeed, highly ordered mesoporous materials derived from sol-gel precursors may rely on strong enthalpic interactions between the precursors and structure directing agents as well.

Compared to the assembly of isotropic particles, nanorod assembly poses additional challenges since rod-rod interactions and changes in orientational entropy can create further thermodynamic opposition to achieving the high volume fractions sufficient to stabilize a mesostructured architecture during template removal. Success in fabricating, for the first time, mesoporous materials from nanorods of $TiO_2$ is due at least in part to the strong enthalpic driving force of PDMA adsorption at the nanorod surfaces. $TiO_2$ is a prototypical material for both electrochemical storage and dye-sensitized solar cells. For both applications, mesoporous $TiO_2$ has shown enhanced performance and, separately, crystallite shape has been suggested to have a strong influence on properties.

Having assembled mesoporous architectures of anatase $TiO_2$ nanorods, their electrochemical cycling performance versus a Li metal counter electrode was evaluated. $TiO_2$ nanorods exhibit exceptional capacity retention at both high (100 C) and more moderate (5 C) charge/discharge rates. Capacity was shown to remain stable at approximately 50 mA/g at 5 C charge/discharge rates and to remain stable at approximately 25 mA/g at 100 C charge/discharge rates over 1000 cycles. This is in contrast to mesoporous films prepared from $TiO_2$ nanospheres, which experience substantial capacity fade upon cycling at moderate rate. The stability of mesoporous $TiO_2$ nanorods at high rate might be expected since charge storage becomes largely capacitive in this limit, with ion transport facilitated by the network of mesopores. However, at moderate rate, a plateau in the loading curves indicates that the $TiO_2$ undergoes a phase transition. Hence, despite the strain accompanying insertion/deinsertion of lithium ions, the mesoporous nanorod films do not degrade with cycling, but instead maintain their architectural integrity.

Furthermore, thicker mesoporous films of nanorods (up to 600 nm) may be made by depositing multiple layers. The capacity scales approximately with film thickness over a range of charge/discharge rates, indicating that the electrolyte can access the mesoporous network throughout the film thickness.

Additional mesoporous architectures are also possible in embodiments, such as those set forth in, Rivest, Jessy, et al. "Evolution of Ordered Metal Chalcogenide Architectures Through Chemical Transformations." Journal of The American Chemical Society. May 10, 2013, 135, 7446-7449, which is incorporated herein by reference. Also incorporated by reference is Rivest, Jessy, et al. "Evolution of Ordered Metal Chalcogenide Architectures Through Chemical Transformations." Supporting Information. May 10, 2013.

Water-dispersible, polymer-wrapped nanocrystals are highly sought after for use in biology and chemistry, from nanomedicine to catalysis. The hydrophobicity of their native ligand shell, however, is a significant barrier to their aqueous transfer as single particles. Embodiments show a general two-step method whereby reactive stripping of native ligands is first carried out using trialkyloxonium salts to reveal a bare nanocrystal surface. This is followed by chemically-directed immobilization of a hydrophilic polymer coating. Polyacrylic acids, with side-chain grafts or functional end groups, are extremely versatile in this regard. The resulting polymer-wrapped nanocrystal dispersions retain much of the compact size of their bare nanocrystal precursors, highlighting the unique role of monomer side chain functionality to serve as effective, conformal ligation motifs. As such, they are well poised for applications where tailored chemical functionality at the nanocrystal's periphery or improved access to their surfaces is desirable.

Dispersions of bare nanocrystals with tailored functionalities are desirable for applications in aqueous media including drug delivery, bioimaging, bioassays, magnetic separations, biochemical remediation, and catalysis and also hold promise for use as nanoinks. Toward this end, embodiments have described the use of Meerwein's and related trialkyloxonium salts as exceptionally mild reagents that efficiently and quantitatively strip native ligands from nanocrystal surfaces without etching them or otherwise perturbing their physical properties. Bare nanocrystals are likewise afforded by chemically treating nanocrystals with $NOBF_4$, although this more aggressive reagent cannot be used with Lewis-acid sensitive metal oxides (e.g., ZnO, AZO, $Cu_2O$, etc.) or metal chalcogenides containing selenium or tellurium due to oxidation of the chalcogenide and complete destruction of the lattice.

Embodiments show that bare nanocrystal surfaces generated using trialkyloxonium salts, with metal adatoms intact, are readily coated by a variety of functional polymers based on the synthetically accessible polyacrylic acid (PAA) platform. A described two-step strategy is highly general, and is highlighted here for dispersions of metal oxide, metal chalcogenide, and inorganic nanocrystals. The PAA scaffold can be functionalized with various end groups or side chains of differing composition or grafting density. In embodiments, several new polymer coatings based on PAA are synthesized using, for example, RAFT polymerization that affords excellent control over the polymer's molecular weight and polydispersity and is amenable to end-group modification. The resulting polymer-nanocrystal hybrids exhibit remarkable stability over extended periods, are easy to purify, and in contrast to some previously explored methods, do not suffer from aggregation or precipitation. The protocol reported herein for preparing functional polymer-inorganic hybrid nanomaterials from bare nanocrystal dispersions dramatically simplifies their synthesis toward greater commercial scalability. Furthermore, with the ability to use a variety of polymers we can tailor the interactions of nanocrystal surfaces with biological systems in order to minimize toxicity thereby allowing their use in clinical setting.

In one embodiment, octadecylphosphonate (ODPA) coated CdSe nanocrystals and ODPA/octylamine (ODPA/OAM) coated CdSe/CdS quantum dot-quantum rods (QD-QRs) are prepared. Oleate coated $Fe_2O_3$ may be synthesized via a microwave-assisted hydrothermal route, while upconverting $\beta$-$NaYF_4$ doped with 20 mol % Yb(III) and 2 mol % Tm(III) may be synthesized using a high temperature synthesis in an organic medium. Polyacrylic acid (MW ~1,800 g $mol^{-1}$) grafted with four methoxy-terminated polyethylene oxides (amide linkages) may be synthesized using DCC-mediated coupling.

Figure 17:
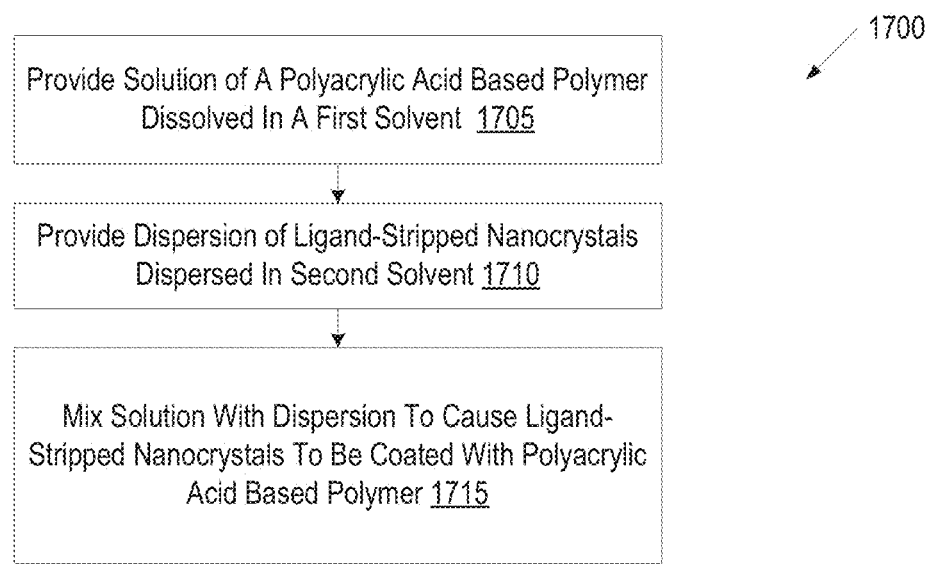
FIG. 17 illustrates one embodiment for a method of coating nanocrystals with a polyacrylic acid based polymer.

Bare Nanocrystal Dispersions in DMF are prepared in accordance with embodiments. The nanocrystals may be any of the aforementioned nanocrystals or other nanocrystals. Stripped nanocrystals can be re-dispersed in polar solvents that engage in dative coordination to their cationic adatoms (e.g., DMF or HMPA). This dynamic, dative coordination sphere of DMF ligands may be readily displaced in favor of stronger-coordinating anionic carboxylate functionality present on polymer side chains. PAA may be selected as a platform for coating nanocrystals with functional polymers both on the basis of its coordination potential to adatoms at the nanocrystal surface, as well as its straightforward synthesis from commercially available materials or via controlled radical polymerization FIG. 17 illustrates one embodiment for a method 1700 of coating nanocrystals with a polyacrylic acid based polymer. At block 1705 of method 1700 a first solution of a polyacrylic acid (PAA) based polymer dissolved in a first solvent is provided. The first solvent may be a polar aprotic solvent. In one embodiment, the first solvent is DMF. The PAA based polymer may be any of the aforementioned PAA-derived polymers. Examples of polymer coatings that may be used include PAA, PAA-mPEO$_4$, PAA-Fluorescein isothiocyanate (FITC), and so on. For example, Boc-NH—CH$_2$CH$_2$-Poly(tert-Butyl Acrylate)-Trithiocarbonate, H$_2$N—CH$_2$CH$_2$-Poly(Acrylic Acid)-Trithiocarbonate, or FITC-NH—CH$_2$—CH$_2$-Poly(Acrylic Acid)-Trithiocarbonate may be used. At block 1715, a dispersion of ligand-stripped nanocrystals in a second solvent is provided. The ligand-stripped nanocrystals may be stripped as described earlier. The ligand-stripped nanocrystals may be any of the aforementioned nanocrystals described herein. The second solvent may be a polar aprotic solvent. In one embodiment, the second solvent is DMF (e.g., e.g., 25 µL-100 µL of DMF).

At block 715, the solution is mixed with the dispersion. Mixing the dispersion and the solution forms a reaction mixture. This results in rapid attachment of PAA-derived polymers to naked nanocrystals, effectively wrapping the nanocrystals with the PAA-derived polymer. An additional volume of water may be added to dissolve the polymer (e.g., PAA-FITC) into the dispersion. The reaction mixture may be sonicated before adding dropwise a borate buffer. The solution may be purified and concentrated, such as by spin dialysis.

A similar procedure may be carried out for the passivation by small molecules (e.g., for citrate coated nanocrystals). Citric acid in DMF (e.g., up to 100 mg mL$^{-1}$) may be employed.

As colloidal dispersions, these new aqueous nanocrystal compositions remained stable for months. Embodiments broadly apply to other functional polymer coatings specifically tailored for biological and chemical applications.

In the case of upconverting NaYF$_4$:Yb/Tm, hydrodynamic diameters of approximately 18-20 nm may be achieved for both PAA and PAA-mPEO$_4$ wrapped nanocrystals, where the bare nanocrystals are approximately 17 nm. For citrate-capped nanocrystals, however, the diameter may be measured at 28 nm consistent with significant aggregation using this procedure. Metal chalcogenide nanocrystals may also be efficiently transferred to water with direct binding of metal adatoms to polymer-bound carboxylates. Thus, for 4.1 nm CdSe nanocrystals, hydrodynamic diameters of 6 nm and 9 nm for CdSe wrapped with PAA and PAA-mPEO$_4$, respectively, may be achieved. CdSe nanocrystals coated by PAA-derived polymers exhibit non-aggregated, uniform dispersions over extended periods of time.

Figure 18:
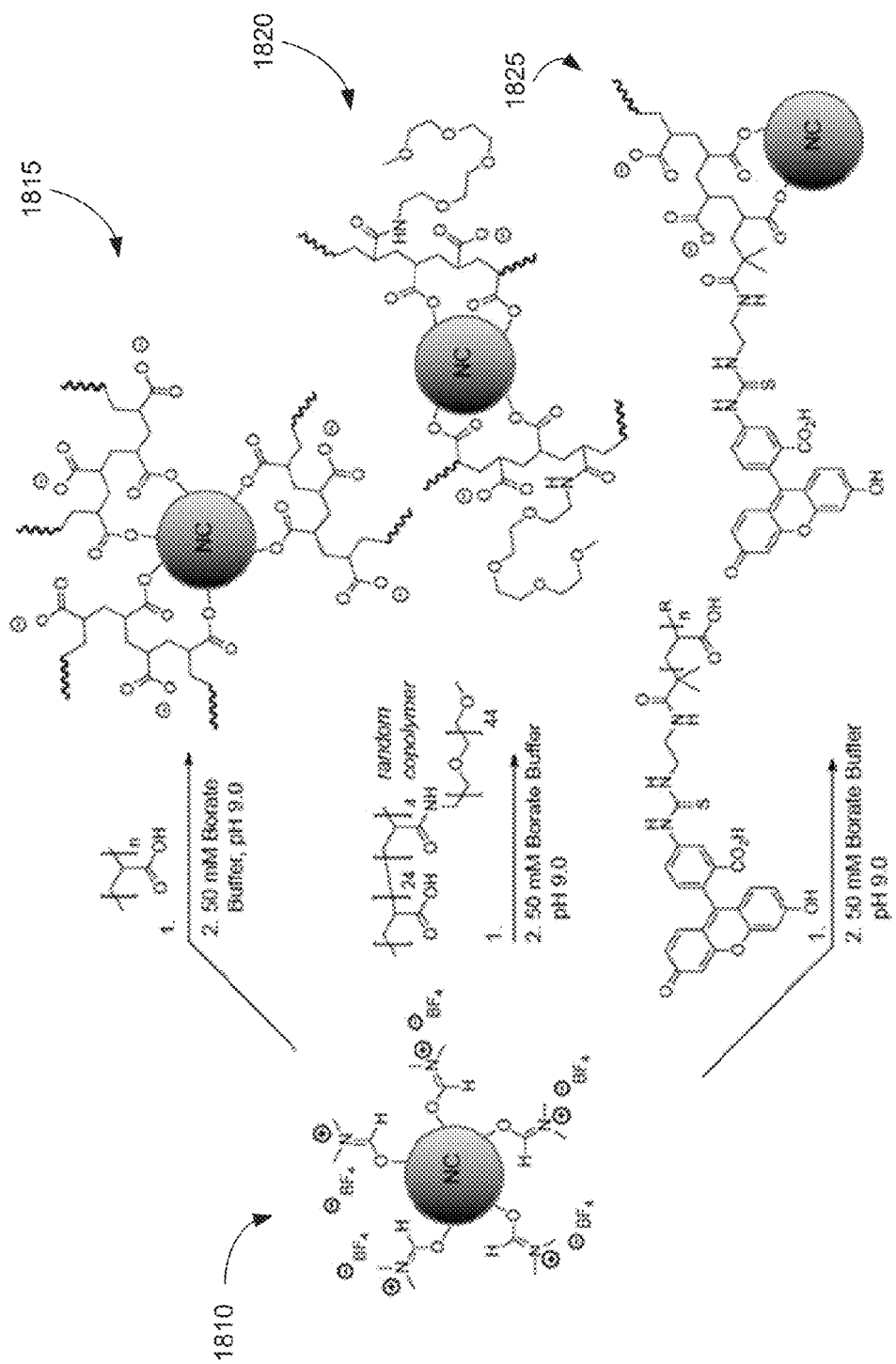
FIG. 18 illustrates coating of a bare NC surface with poly(acrylic acid)-derived polymers.

FIG. 18 illustrates coating of a bare NC surface with poly(acrylic acid)-derived polymers. More particularly, FIG. 18 shows a bare (naked) nanocrystal 1810. The bare nanocrystal 1810 may be coated with a PAA polymer to form PAA-coated polymer 1815. The bare nanocrystal 1810 may be coated with a PAA-mPEO$_4$ polymer to form PAA-mPEO$_4$-coated polymer 1820. The bare nanocrystal 1810 may be coated with a PAA-FITC polymer to form PAA-FITC-coated polymer 1825. The coated polymers may subsequently be transferred into an aqueous buffer (e.g., a 50 mM borate buffer).

Embodiments are also successful in manipulating the surface of nanocrystals with more elaborate polymer coatings. For example, an FITC-PAA polymer derived from RAFT polymerization may be readily placed at the surface of otherwise colorless dispersions of bare, upconverting NaYF$_4$:Yb/Tm nanocrystals. Upconverting nanocrystals based on these materials offer photostable luminescence suitable for single particle imaging, sharp emission bandwidths, and large anti-Stokes shifts. The mildness of the two-step procedure described in embodiments is able to retain both the luminescence of the appended dyes now localized to the nanocrystal surface as well as dimensions and crystal phase of the NaYF$_4$ lattice that maintains high photon upconversion efficiency. The dispersions are uniform and stable (i.e. no precipitation).

The above examples are provided to illustrate embodiments of the present invention but not to limit its scope. Other variants of the invention will be readily apparent to one of ordinary skill in the art. The scope of the invention should, therefore, be determined with reference to the appended claims, along with the full scope of equivalents to which such claims are entitled.

What is claimed is:

1. A method comprising:
   providing a plurality of nanocrystals, wherein the plurality of nanocrystals comprise organic ligands at surfaces of the plurality of nanocrystals; and
   removing the organic ligands from the surfaces of the plurality of nanocrystals using a solution comprising a trialkyloxonium salt in a polar aprotic solvent, wherein removal of the organic ligands causes the plurality of nanocrystals to become a plurality of naked nanocrystals with cationic surfaces.

2. The method of claim 1, further comprising:
   providing a dispersion comprising the plurality of nanocrystals in a non-polar solvent; and
   mixing the solution comprising the trialkyloxonium salt with the dispersion to remove the organic ligands from the surfaces of the plurality of nanocrystals in the dispersion.

3. The method of claim 2, wherein the non-polar solvent comprises at least one of hexane, toluene, or chloroform.

4. The method of claim 2, further comprising purifying the plurality of nanocrystals based on performing the following comprising:
   mixing a first liquid into the dispersion comprising the plurality of naked nanocrystals, wherein the plurality of nanocrystals are all insolvent in the first liquid; and
   precipitating out the plurality of naked nanocrystals from the dispersion.

5. The method of claim 4, further comprising:
   re-dispersing the plurality of naked nanocrystals into a second liquid to form a new dispersion that acts as a stable dispersant for the plurality of naked nanocrystals, wherein the second liquid comprises at least one of N,N-dimethylformamide (DMF) or hexamethylphosphoramide (HMPA).

6. The method of claim 5, further comprising:
   depositing the new dispersion onto a substrate to form a film comprising the plurality of naked nanocrystals; and
   evaporating out the second liquid from the film.

7. The method of claim 1, further comprising:
   coating surfaces of the naked nanocrystals with a polymer comprising poly acrylic acid (PAA), wherein the polymer acts as a stabilizer in an aqueous buffer.

8. The method of claim 1, wherein the polar aprotic solvent comprises at least one of N,N-dimethylformamide (DMF), acetonitrile or dichloromethane.

9. The method of claim 1, wherein the trialkyloxonium salt comprises at least one of trimethyloxonium, triethyloxonium or tripropyloxonium.

10. The method of claim 1, wherein the solution further comprises at least one of tetrafluoroborate, hexafluoroborate, hexachloroantimonate, tetrachloroaurate, tetrabromoaurate, tetrachloroferrate or tetrabromoferrate to act as counter ions when the organic ligands are stripped from the surfaces of the plurality of nanocrystals.

11. The method of claim 1, further comprising:
depositing a dispersion comprising the plurality of nanocrystals having the organic ligands onto a substrate to form a film on the substrate; and
treating the film with the solution comprising the trialkyloxonium salt and the polar aprotic solvent to remove the organic ligands from the plurality of nanocrystals in the film.

12. A method comprising:
providing a dispersion comprising a plurality of nanocrystals in a polar aprotic solvent, wherein the plurality of nanocrystals are naked nanocrystals having cationic surfaces;
adding a polymer comprising a nanocrystal tethering domain and porogenic domain to the dispersion; and
forming an article having an ordered composite from the dispersion, the ordered composite comprising (i) a polymer matrix formed from the porogenic domain of the polymer and (ii) the plurality of nanocrystals embedded in the polymer matrix at the nanocrystal tethering domain.

13. The method of claim 12, further comprising:
thermally or chemically treating the article to remove the polymer and transform the ordered composite into a mesoporous architecture comprising the plurality of nanocrystals arranged in regular lattices that are ordered in all dimensions.

14. The method of claim 12, wherein:
the polymer comprises a block copolymer;
the nanocrystal tethering domain comprises a first polymer of the block copolymer, the first polymer comprising at least one of poly(N,N-dimethylacrylamide) (PDMA), poly(N,N-dimethylacrylamide-co-acrylic acid), polyoxazalines, polypeptoids, poly(vinylpyridines), or poly(acrylic acid); and
the porogenic domain comprises a second polymer of the block copolymer, the second polymer comprising at least one of homomeric polyisoprene, polybutadiene, polyacrylates, polymethacrylates, polystyrene (PS), polynorbornenes, polyesters, polyethers, polycarbonates, polyethylene, branched polyethylene, polypropylene, or a copolymer therefrom.

15. The method of claim 14, further comprising:
controlling a dimensionality of a wall of the article by controlling a first volume fraction of the first polymer in the block copolymer and a second volume fraction of the second polymer in the block copolymer, wherein the wall is increased in size by increasing the first volume fraction.

16. The method of claim 14, wherein the block copolymer is a block copolymer supramolecule, the method further comprising:
adding an initial block copolymer into a first solvent that is a solvent for both the first polymer and the second polymer; and
adding a second solvent that is a solvent for a first one of the first polymer and the second polymer but not for a second one of the first polymer and the second polymer to cause the initial block copolymer to preassemble into the block copolymer supramolecule.

17. The method of claim 16, wherein the first solvent comprises N,N-dimethylformamide (DMF) and the second solvent comprises one of water, methanol or ethanol.

18. The method of claim 16, wherein forming the article comprises:
mixing an additional liquid into the dispersion, wherein the plurality of nanocrystals, the first polymer and the second polymer are all insolvent in the additional liquid; and
wherein the article comprising the ordered composite of the polymer and the plurality of nanocrystals crashes out of the dispersion.

19. The method of claim 12, wherein forming the article comprises:
depositing the dispersion onto a substrate to form a film comprising the ordered composite.

20. The method of claim 19, wherein the polymer comprises a block copolymer, wherein the block copolymer has not been preassembled into a block copolymer supramolecule, and wherein after depositing the dispersion onto the substrate the polymer self assembles and arranges the plurality of nanocrystals as the polar aprotic solvent evaporates.

21. The method of claim 12, further comprising:
controlling a dimensionality of a wall of the article by controlling a first volume fraction of the nanocrystals to a second volume fraction of the polymer.

22. A composition comprising:
a plurality of inorganic nanocrystals, wherein the plurality of inorganic nanocrystals are naked nanocrystals comprising ligand-stripped cationic surfaces.

23. The composition of claim 22, further comprising:
a polar aprotic solvent, the plurality of inorganic nanocrystals forming a stable dispersion in the polar aprotic solvent.

24. The composition of claim 23, wherein the polar aprotic solvent comprises at least one of N,N-dimethylformamide (DMF), acetonitrile or dichloromethane.

25. The composition of claim 22, further comprising:
a film, the plurality of inorganic nanocrystals being a component of the film.

26. The composition of claim 22, further comprising:
a mesoporous architecture comprising the plurality of nanocrystals arranged in regular lattices that are ordered in all dimensions.

27. The composition of claim 22, further comprising:
an ordered composite comprising (i) a polymer matrix formed from a porogenic domain of a polymer and (ii) the plurality of nanocrystals embedded in the polymer matrix at a nanocrystal tethering domain of the polymer.

28. The composition of claim 27, wherein:
the polymer comprises a block copolymer;
the nanocrystal tethering domain comprises a first polymer of the block copolymer; and
the porogenic domain comprises a second polymer of the block copolymer.

29. The composition of claim 28, wherein the first polymer comprises at least one of poly(N,N-dimethylacrylamide) (PDMA), poly(N,N-dimethylacrylamide-co-acrylic acid), polyoxazalines, polypeptoids, poly(vinylpyridines) or poly(acrylic acid), and the second polymer comprises at least one of homomeric polyisoprene, polybutadiene, polyacrylates, polymethacrylates, polystyrene (PS), polynorbornenes, polyesters, polyethers, polycarbonates, polyethylene, branched polyethylene, polypropylene, or a copolymer therefrom.

30. The composition of claim 22, wherein the plurality of nanocrystals comprise at least one of CdSe, CdSe/CdS, CdSe/ZnS, CdTe, PbSe, PbS, PbTe, $\alpha$-$Fe_2O_3$, ZnO, Al-doped ZnO, doped $NaYF_4$:Yb/Tm, Ag, doped $In_2O_3$, indium tin oxide (ITO), $CeO_2$, $TiO_2$, Yb, Er-doped $NaYF_4$ or FePt.

* * * * *